(12) United States Patent
Kilibarda et al.

(10) Patent No.: US 11,420,853 B2
(45) Date of Patent: Aug. 23, 2022

(54) ASSEMBLY MATERIAL LOGISTICS SYSTEM AND METHODS

(71) Applicant: Comau LLC, Southfield, MI (US)

(72) Inventors: Velibor Kilibarda, Southfield, MI (US); Freddie Tappo, Sterling Heights, MI (US)

(73) Assignee: Comau LLC, Southfield, MI (US)

( * ) Notice: Subject to any disclaimer, the term of this patent is extended or adjusted under 35 U.S.C. 154(b) by 0 days.

(21) Appl. No.: 17/039,250

(22) Filed: Sep. 30, 2020

(65) Prior Publication Data

US 2021/0101790 A1 Apr. 8, 2021

Related U.S. Application Data

(60) Provisional application No. 63/036,172, filed on Jun. 8, 2020, provisional application No. 62/910,329, filed on Oct. 3, 2019.

(51) Int. Cl.
*B66F 9/06* (2006.01)
*B65G 1/04* (2006.01)
*G05D 1/02* (2020.01)

(52) U.S. Cl.
CPC ............ *B66F 9/063* (2013.01); *B65G 1/0407* (2013.01); *G05D 1/0225* (2013.01)

(58) Field of Classification Search
CPC .............. B62D 65/18; G05B 19/41895; B65G 1/0407; B65G 1/0485; B65G 65/00; B66F 9/063
USPC ....................................................... 414/268
See application file for complete search history.

(56) References Cited

U.S. PATENT DOCUMENTS

| 2,493,005 | A | 1/1950 | Williams |
| 2,835,964 | A | 5/1958 | Yarwood |
| 3,444,802 | A | 5/1969 | Barton |
| 3,854,889 | A | 12/1974 | Lemelson |
| 4,032,018 | A | 6/1977 | Wallis |
| 4,162,387 | A | 7/1979 | De Candia |

(Continued)

FOREIGN PATENT DOCUMENTS

| CA | 2718907 A1 | 9/2009 |
| CA | 2663307 A1 | 11/2009 |

(Continued)

OTHER PUBLICATIONS

Ts 1 Transfer System; Bosch Rexroth AG, Sep. 25, 2018.

(Continued)

*Primary Examiner* — Kaitlin S Joerger
(74) *Attorney, Agent, or Firm* — Young Basile Hanlon & MacFarlane, P.C.

(57) ABSTRACT

System devices and methods for logistical handling and transfer of components and consumable assembly materials to support assembly or manufacturing operations. Through use of a transport vehicle having first and second container supports, the method allows in a component storage area and an assembly area, the transport vehicle both engaging or picking up a full or empty container and disengaging or depositing a full or empty container. In an alternate example, two separate transport vehicles can coordinatingly move together to engage or pick up a full or empty container and disengage or deposit a full or empty container in the component storage area or assembly area.

20 Claims, 16 Drawing Sheets

(56) References Cited

U.S. PATENT DOCUMENTS

| | | |
|---|---|---|
| 4,232,370 A | 11/1980 | Tapley |
| 4,273,242 A | 6/1981 | Schaper |
| 4,328,422 A | 5/1982 | Loomer |
| 4,344,221 A | 8/1982 | Pagani |
| 4,369,563 A | 1/1983 | Williamson |
| 4,400,607 A | 8/1983 | Wakou et al. |
| 4,404,505 A | 9/1983 | Swanson et al. |
| 4,442,335 A | 4/1984 | Rossi |
| 4,456,810 A | 6/1984 | Schumacher et al. |
| 4,492,504 A | 1/1985 | Hainsworth |
| 4,530,056 A | 7/1985 | MacKinnon et al. |
| 4,600,136 A | 7/1986 | Sciaky et al. |
| 4,606,488 A | 8/1986 | Yanagisawa |
| 4,657,463 A | 4/1987 | Pipes |
| 4,659,895 A | 4/1987 | Di Rosa |
| 4,667,866 A | 5/1987 | Tobita et al. |
| 4,673,076 A | 6/1987 | Mattson |
| 4,679,297 A | 7/1987 | Hansen, Jr. et al. |
| 4,732,224 A | 3/1988 | Deeter et al. |
| 4,734,979 A | 4/1988 | Sakamoto et al. |
| 4,736,515 A | 4/1988 | Catena |
| 4,738,387 A | 4/1988 | Jaufmann et al. |
| 4,774,757 A | 10/1988 | Sakamoto et al. |
| 4,779,787 A | 10/1988 | Naruse et al. |
| 4,795,075 A | 1/1989 | Pigott et al. |
| 4,800,249 A | 1/1989 | Di Rosa |
| 4,815,190 A | 3/1989 | Haba, Jr. et al. |
| 4,872,419 A | 10/1989 | Blankemeyer et al. |
| 4,885,836 A | 12/1989 | Bonomi et al. |
| 4,896,014 A | 1/1990 | Sakai et al. |
| 4,928,383 A | 5/1990 | Kaczmarek et al. |
| 4,944,357 A | 7/1990 | Wible et al. |
| 4,967,947 A | 11/1990 | Sarh |
| 5,011,068 A | 4/1991 | Stoutenburg et al. |
| 5,086,908 A | 2/1992 | Gladish et al. |
| 5,091,855 A | 2/1992 | Umehara et al. |
| 5,123,148 A | 6/1992 | Ikeda et al. |
| 5,152,050 A | 10/1992 | Kaczmarek et al. |
| 5,177,862 A | 1/1993 | Speece |
| 5,199,156 A | 4/1993 | Rossi |
| 5,239,739 A | 8/1993 | Akeel et al. |
| 5,272,805 A | 12/1993 | Akeel et al. |
| 5,285,604 A | 2/1994 | Carlin |
| 5,301,411 A | 4/1994 | Fujiwara et al. |
| 5,319,840 A | 6/1994 | Yamamoto et al. |
| 5,347,700 A | 9/1994 | Tominaga et al. |
| 5,353,495 A * | 10/1994 | Terabayashi ......... B23Q 7/1442 198/346.2 |
| 5,397,047 A | 3/1995 | Zampini |
| 5,400,944 A | 3/1995 | Zimmer et al. |
| 5,427,300 A | 6/1995 | Quaglinè |
| 5,433,783 A | 7/1995 | Ichinose et al. |
| 5,525,025 A * | 6/1996 | Ootmar Ten Cate ........................ B23Q 7/1442 198/782 |
| 5,531,830 A | 7/1996 | Ichinose et al. |
| 5,538,382 A | 7/1996 | Hasegawa et al. |
| 5,560,535 A | 10/1996 | Miller et al. |
| 5,577,593 A | 11/1996 | Hooper |
| 5,577,595 A | 11/1996 | Pollock et al. |
| 5,697,752 A | 12/1997 | Dugas et al. |
| 5,779,609 A | 7/1998 | Cullen et al. |
| 5,853,215 A | 12/1998 | Lowery |
| 5,864,991 A | 2/1999 | Burns |
| 5,882,174 A | 3/1999 | Woerner et al. |
| 5,896,637 A | 4/1999 | Sarh |
| 5,902,496 A | 5/1999 | Alborante |
| 5,940,961 A | 8/1999 | Parete |
| 5,943,768 A | 8/1999 | Ray |
| 6,008,471 A | 12/1999 | Alborante |
| 6,059,169 A | 5/2000 | Nihei et al. |
| 6,065,200 A | 5/2000 | Negre |
| 6,098,268 A | 8/2000 | Negre et al. |
| 6,132,509 A | 10/2000 | Kuschnereit |
| 6,138,889 A | 10/2000 | Campani et al. |
| 6,142,725 A | 11/2000 | Crorey |
| 6,170,732 B1 | 1/2001 | Vogt et al. |
| 6,193,142 B1 | 2/2001 | Segawa et al. |
| 6,250,533 B1 | 6/2001 | Otterbein et al. |
| 6,253,504 B1 | 7/2001 | Cohen et al. |
| 6,324,880 B1 | 12/2001 | Nakamura |
| 6,325,435 B1 | 12/2001 | Dubuc |
| 6,336,582 B1 | 1/2002 | Kato et al. |
| 6,349,237 B1 | 2/2002 | Koren et al. |
| 6,457,231 B1 | 10/2002 | Carter et al. |
| 6,467,675 B1 | 10/2002 | Ozaku et al. |
| 6,513,231 B1 | 2/2003 | Hafenrichter et al. |
| 6,516,234 B2 | 2/2003 | Kamiguchi et al. |
| 6,557,690 B2 | 5/2003 | Oldford et al. |
| 6,564,440 B2 | 5/2003 | Oldford et al. |
| 6,627,016 B2 | 9/2003 | Abare et al. |
| 6,634,097 B1 | 10/2003 | Ikeda |
| 6,651,392 B2 | 11/2003 | Ritzal |
| 6,688,048 B2 | 2/2004 | Staschik |
| 6,705,001 B2 | 3/2004 | How et al. |
| 6,705,523 B1 | 3/2004 | Stamm et al. |
| 6,712,230 B2 | 3/2004 | Lopez Alba |
| 6,719,122 B2 | 4/2004 | Oldford et al. |
| 6,744,436 B1 | 6/2004 | Chirieleison, Jr. et al. |
| 6,799,672 B2 | 10/2004 | Wood |
| 6,799,673 B2 | 10/2004 | Kilabarda |
| 6,801,821 B2 | 10/2004 | Madden et al. |
| 6,813,539 B2 | 11/2004 | Morimoto et al. |
| 6,857,529 B2 | 2/2005 | Lopez Alba |
| 6,916,375 B2 | 7/2005 | Molnar et al. |
| 6,948,227 B2 | 9/2005 | Kilibarda et al. |
| 6,966,427 B2 | 11/2005 | Kilibarda |
| 6,990,715 B2 | 1/2006 | Liu et al. |
| 6,991,064 B2 | 1/2006 | Ehrenleitner |
| 7,076,865 B2 | 7/2006 | Morbitzer et al. |
| 7,108,189 B2 | 9/2006 | Kilibarda |
| 7,232,027 B2 | 6/2007 | Kilibarda |
| 7,331,439 B2 | 2/2008 | Degain et al. |
| 7,356,378 B1 | 4/2008 | Huang et al. |
| 7,357,376 B2 | 4/2008 | Assmann |
| 7,490,710 B1 | 2/2009 | Weskamp et al. |
| 7,546,942 B2 | 6/2009 | Monti et al. |
| 7,845,121 B2 | 12/2010 | Wobben |
| 7,946,030 B2 | 5/2011 | Tanaka et al. |
| 8,097,451 B2 | 1/2012 | Gaalswyk |
| 8,108,989 B2 * | 2/2012 | Muhlenkamp ......... B23P 21/004 29/799 |
| 8,127,687 B2 | 3/2012 | Spangler et al. |
| 8,201,723 B2 | 6/2012 | Kilibarda |
| 8,229,586 B2 | 7/2012 | Wallace et al. |
| 8,250,743 B2 | 8/2012 | Habisreitinger |
| 8,308,048 B2 | 11/2012 | Kilibarda |
| 8,360,225 B2 | 1/2013 | Spangler et al. |
| 8,474,132 B2 | 7/2013 | Li et al. |
| 8,474,683 B2 | 7/2013 | Kilibarda |
| 8,527,153 B2 | 9/2013 | Doan |
| 8,561,780 B2 | 10/2013 | Albeck et al. |
| 8,713,780 B2 | 5/2014 | Kilibarda |
| 8,733,617 B2 | 5/2014 | Kilibarda |
| 8,789,269 B2 | 7/2014 | Kilibarda et al. |
| 8,869,370 B2 | 10/2014 | Kilibarda |
| 9,014,836 B2 | 4/2015 | Stone et al. |
| 9,132,873 B1 | 9/2015 | Laurence et al. |
| 9,513,625 B2 | 12/2016 | Kilibarda |
| 9,581,983 B2 | 2/2017 | Kilibarda et al. |
| 9,802,766 B2 | 10/2017 | Ookada et al. |
| 9,815,511 B2 | 11/2017 | Kilibarda et al. |
| 10,384,873 B2 | 8/2019 | Kilibarda et al. |
| 2002/0087226 A1 | 7/2002 | Boudreau |
| 2002/0103569 A1 | 8/2002 | Mazur |
| 2002/0129566 A1 | 9/2002 | Piccolo et al. |
| 2002/0135116 A1 | 9/2002 | Dugas et al. |
| 2002/0162209 A1 | 11/2002 | Hosono et al. |
| 2002/0166842 A1 | 11/2002 | Grebenisan |
| 2003/0037432 A1 | 2/2003 | McNamara |
| 2003/0057256 A1 | 3/2003 | Nakamura et al. |
| 2003/0085192 A1 | 5/2003 | Lopez Alba |
| 2003/0115746 A1 | 6/2003 | Saito et al. |
| 2003/0175429 A1 | 9/2003 | Molnar et al. |

(56) References Cited

U.S. PATENT DOCUMENTS

| | | |
|---|---|---|
| 2003/0188952 A1 | 10/2003 | Oldford et al. |
| 2003/0189085 A1 | 10/2003 | Kilibarda et al. |
| 2004/0002788 A1 | 1/2004 | Morimoto et al. |
| 2004/0020974 A1 | 2/2004 | Becker et al. |
| 2004/0055129 A1 | 3/2004 | Ghuman |
| 2004/0149692 A1 | 8/2004 | Masanori |
| 2004/0216983 A1 | 11/2004 | Oldford et al. |
| 2004/0221438 A1 | 11/2004 | Savoy et al. |
| 2004/0258513 A1 | 12/2004 | Cooke |
| 2005/0008469 A1 | 1/2005 | Jung |
| 2005/0025612 A1 | 2/2005 | Ehrenleitner |
| 2005/0035175 A1 | 2/2005 | Nakamura et al. |
| 2005/0044700 A1 | 3/2005 | Ghuman et al. |
| 2005/0120536 A1 | 6/2005 | Kilibarda et al. |
| 2005/0153075 A1 | 7/2005 | Molnar et al. |
| 2005/0189399 A1 | 9/2005 | Kilibarda |
| 2005/0230374 A1 | 10/2005 | Rapp et al. |
| 2005/0236461 A1 | 10/2005 | Kilibarda et al. |
| 2005/0269382 A1 | 12/2005 | Caputo et al. |
| 2006/0157533 A1 | 7/2006 | Onoue et al. |
| 2006/0231371 A1 | 10/2006 | Moliere et al. |
| 2006/0288577 A1 | 12/2006 | Bormuth |
| 2007/0087924 A1 | 4/2007 | Krosta et al. |
| 2007/0101567 A1 | 5/2007 | Suda et al. |
| 2007/0164009 A1 | 7/2007 | Hesse |
| 2007/0175869 A1 | 8/2007 | Auger et al. |
| 2007/0215579 A1 | 9/2007 | Auger |
| 2007/0258797 A1 | 11/2007 | Gordon et al. |
| 2008/0022609 A1 | 1/2008 | Franco et al. |
| 2008/0061110 A1 | 3/2008 | Monti et al. |
| 2008/0084013 A1 | 4/2008 | Kilibarda |
| 2008/0104815 A1 | 5/2008 | Kussmaul |
| 2008/0105733 A1 | 5/2008 | Monti et al. |
| 2008/0116247 A1 | 5/2008 | Kilibarda |
| 2008/0131255 A1 | 6/2008 | Hessler et al. |
| 2008/0148546 A1 | 6/2008 | Monti et al. |
| 2008/0178537 A1 | 7/2008 | Spangler et al. |
| 2008/0181753 A1 | 7/2008 | Bastian et al. |
| 2008/0223692 A1 | 9/2008 | Tanahashi |
| 2008/0274865 A1* | 11/2008 | Sturm .................. B23P 19/001 29/564 |
| 2008/0295335 A1 | 12/2008 | Kilibarda et al. |
| 2009/0056116 A1 | 3/2009 | Presley et al. |
| 2009/0078741 A1 | 3/2009 | Sata et al. |
| 2009/0118858 A1 | 5/2009 | Wallace et al. |
| 2009/0191032 A1 | 7/2009 | Bogaczyk |
| 2009/0234488 A1 | 9/2009 | Kilibarda |
| 2009/0277747 A1 | 11/2009 | Spangler et al. |
| 2009/0277748 A1 | 11/2009 | Spangler et al. |
| 2009/0277754 A1 | 11/2009 | Spangler et al. |
| 2009/0277755 A1 | 11/2009 | Spangler et al. |
| 2009/0279992 A1 | 11/2009 | Spangler et al. |
| 2009/0285666 A1 | 11/2009 | Kilibarda |
| 2009/0300998 A1 | 12/2009 | Ablett |
| 2010/0136883 A1 | 6/2010 | Call et al. |
| 2010/0180711 A1 | 7/2010 | Kilibarda et al. |
| 2010/0241260 A1 | 9/2010 | Kilibarda et al. |
| 2010/0290870 A1 | 11/2010 | Ezure et al. |
| 2010/0301099 A1 | 12/2010 | Sata et al. |
| 2010/0326832 A1 | 12/2010 | Albeck et al. |
| 2011/0017132 A1 | 1/2011 | Robbin |
| 2011/0047788 A1 | 3/2011 | Immekus et al. |
| 2011/0047791 A1 | 3/2011 | Ferenczi et al. |
| 2011/0138601 A1 | 6/2011 | Kilibarda |
| 2011/0192007 A1 | 8/2011 | Kilibarda |
| 2011/0252719 A1 | 10/2011 | Wallance |
| 2011/0265301 A1 | 11/2011 | Kilibarda |
| 2011/0314665 A1 | 12/2011 | Kilibarda |
| 2012/0005968 A1 | 1/2012 | Patino |
| 2012/0216384 A1 | 8/2012 | Immekus |
| 2012/0222277 A1 | 9/2012 | Spangler et al. |
| 2012/0274000 A1 | 11/2012 | Gaiser |
| 2012/0304446 A1 | 12/2012 | Kilibarda |
| 2013/0026002 A1 | 1/2013 | Spangler |
| 2013/0035783 A1 | 2/2013 | Scheuerman et al. |
| 2013/0109291 A1 | 5/2013 | Holtz et al. |
| 2014/0217155 A1 | 8/2014 | Kilibarda |
| 2014/0224621 A1 | 8/2014 | Monti et al. |
| 2015/0001287 A1 | 5/2015 | Kilibarda |
| 2015/0128719 A1 | 5/2015 | Kilibarda |
| 2017/0320669 A1 | 11/2017 | Kilibarda et al. |
| 2017/0344009 A1 | 11/2017 | Wernersbach |
| 2018/0093728 A1 | 4/2018 | Mayr |
| 2020/0398916 A1* | 12/2020 | Finke ................. B65G 65/00 |
| 2021/0171141 A1* | 6/2021 | Finke ................. B62D 65/18 |

FOREIGN PATENT DOCUMENTS

| | | |
|---|---|---|
| CA | 2659143 A1 | 4/2010 |
| CA | 2904751 A1 | 4/2010 |
| CA | 2904752 A1 | 4/2010 |
| CA | 2786113 A1 | 7/2011 |
| CN | 101579792 A | 11/2009 |
| CN | 101722421 A | 6/2010 |
| CN | 102706746 A | 10/2012 |
| CN | 103649857 A | 3/2014 |
| DE | 19806963 A1 | 10/1998 |
| DE | 19736252 A1 | 3/1999 |
| DE | 20012052 U1 | 10/2000 |
| DE | 19940992 A1 | 3/2001 |
| DE | 102004057664 A1 | 6/2006 |
| DE | 102005062691 A1 | 7/2007 |
| DE | 202007005034 U1 | 8/2008 |
| DE | 202013004209 U1 | 7/2013 |
| DE | 102015000968 A1 | 4/2016 |
| EP | 201262 | 11/1986 |
| EP | 0232999 A2 | 8/1987 |
| EP | 0261297 A1 | 3/1988 |
| EP | 0446518 A1 | 9/1991 |
| EP | 574779 A1 | 12/1993 |
| EP | 0673711 A1 | 9/1995 |
| EP | 0865869 A1 | 9/1998 |
| EP | 1298043 A2 | 4/2003 |
| EP | 1302415 A1 | 4/2003 |
| EP | 1310324 A1 | 5/2003 |
| EP | 1362663 A2 | 11/2003 |
| EP | 1403176 A2 | 3/2004 |
| EP | 1426275 A1 | 6/2004 |
| EP | 2082831 A1 | 7/2009 |
| EP | 2100804 A1 | 9/2009 |
| EP | 2119532 A1 | 11/2009 |
| EP | 2332689 A1 | 6/2011 |
| EP | 2505299 A1 | 10/2012 |
| EP | 2585656 A2 | 5/2013 |
| EP | 2715465 A1 | 4/2014 |
| FR | 3049481 A1 | 10/2017 |
| GB | 2231687 A | 11/1990 |
| GB | 2250723 A | 6/1992 |
| GB | 2271651 A | 4/1994 |
| JP | S6340683 A | 2/1988 |
| JP | S6413515 U | 1/1989 |
| JP | H06345397 A | 12/1994 |
| JP | H0740059 A | 2/1995 |
| JP | 10101222 | 4/1998 |
| JP | H11104848 A | 4/1999 |
| JP | 2005205431 A | 8/2005 |
| JP | 2011121089 A | 6/2011 |
| WO | 8603153 A1 | 6/1986 |
| WO | 0068117 A1 | 11/2000 |
| WO | 2006109246 A1 | 10/2006 |
| WO | 2007077056 A1 | 7/2007 |
| WO | 2009131293 A1 | 10/2009 |
| WO | 2011053681 A1 | 5/2011 |
| WO | 2011085175 A2 | 7/2011 |
| WO | 2011162930 A1 | 12/2011 |
| WO | 2012166775 A1 | 12/2012 |
| WO | 2016100220 A1 | 6/2016 |

OTHER PUBLICATIONS

Flexible Transport System: Assembly Technology With High Degree of Freedom; Harro Hofliger; Sep. 25, 2018.

(56) References Cited

OTHER PUBLICATIONS

FMC; Automated Fork lifts and Material Handling Lifts—Forked Automated Guided Vehicles; http://www.fmcsgvs.com/content/products/forked.sub.-vehicles.htm;p. 1.
FMC; SGV (Self Guided Vehicles)—Automated Guided Vehicle Systems; http://www.fmcsgvs.com/content/products/sgv.htm, p. 1.
FMC; Automated Material Handling Systems & Equipment for Material Movement: AGV Applications; http://www.fmcsgvs.com/content/sales/applications.htm; pp. 1-2.
FMC; Layout Wizard AGV Configuration Software; http://fmcsgvs.com/content/products/wizard.htm; p. 1.
FMC; AGV System Controls; http://www.fmcsgvs.com/content/products/system.htm; p. 1.
FMC; Laser Navigation Controls; http://www.fmcsgvs.com/content/products/nav.htm; pp. 1-2.
European Search Report dated Apr. 19, 2011 from the corresponding European Patent Application No. 11152656.2-2302.
European Search Report dated Aug. 28, 2009 from the corresponding European Patent Application No. 09158794.9-2302.
International Preliminary Report of Patentability in corresponding application PCT/2014/064948, dated May 17, 2016.
International Search Report and Written Opinion of the International Searching Authority dated Oct. 9, 2012 from the corresponding International Application No. PCT/US2012/039952.
International Search Report and Written Opinion of the International Searching Authority dated Aug. 29, 2011 from the corresponding International Application No. PCT/US2011/039097.
FMC; Automated Fork lifts and Material Handling Lifts-Forked Automated Guided Vehicles; http://www.fmcsgvs.com/content/products/forked.sub.-vehicles.htm;p. 1., printed Mar. 26, 2008.
FMC; SGV (Self Guided Vehicles)—Automated Guided Vehicle Systems; http://www.fmcsgvs.com/content/products/sgv.htm, p. 1., printed Mar. 26, 2008.
FMC; Automated Material Handling Systems & Equipment for Material Movement: AGV Applications; http://www.fmcsgvs.com/content/sales/applications.htm; pp. 1-2., printed Mar. 26, 2008.
FMC; Layout Wizard AGV Configuration Software; http://fmcsgvs.com/content/products/wizard.htm; p. 1., printed Mar. 26, 2008.
FMC; Laser Navigation Controls; http://www.fmcsgvs.com/content/products/nav.htm; pp. 1-2., printed Mar. 26, 2008.
European Search Report dated Jul. 13, 2009 from the corresponding European Application No. 09151980.1-1523.
FMC; AGV System Controls; http://www.fmcsgvs.com/content/products/system.htm; p. 1., printed Mar. 26, 2008.
Mats Jackson and Abedullah Zaman, Factory-In-a-Box-Mobile Production Capacity of Demand, International Journal of Modern Engineering vol. 8, No. 1 Fall2007.
Notification of Transmittal, the International Search Report and the Written Opinion of the International Searching Authority dated Jan. 28, 2013, from the corresponding International Application No. PCT/US2011/020486 filed Jan. 7, 2011.
International Search Report in related matter PCT/US2015/065588, dated May 19, 2016, 25 pages.
AGV Systems—Automatic Guided Vehicles, Intralogistics Division https://www.cassioli.com/intralogistics-division/automated-vehicles/agv-automatic-guided-vehicles/> accessed Jul. 6, 2022.

\* cited by examiner

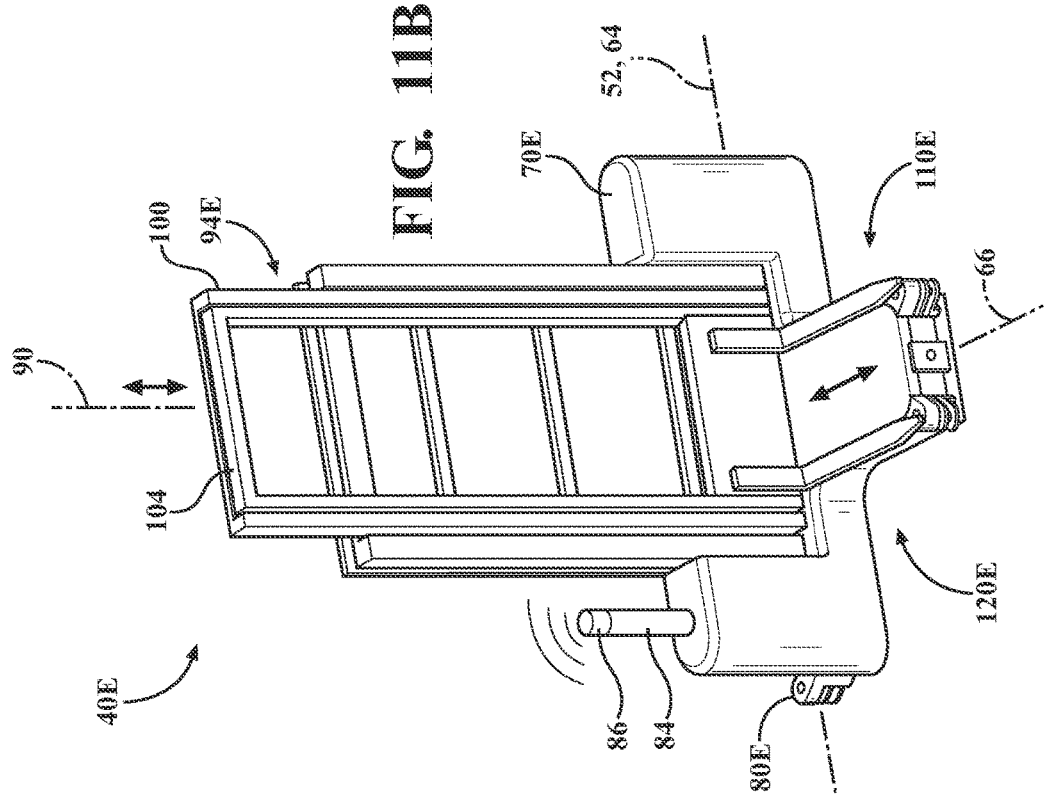
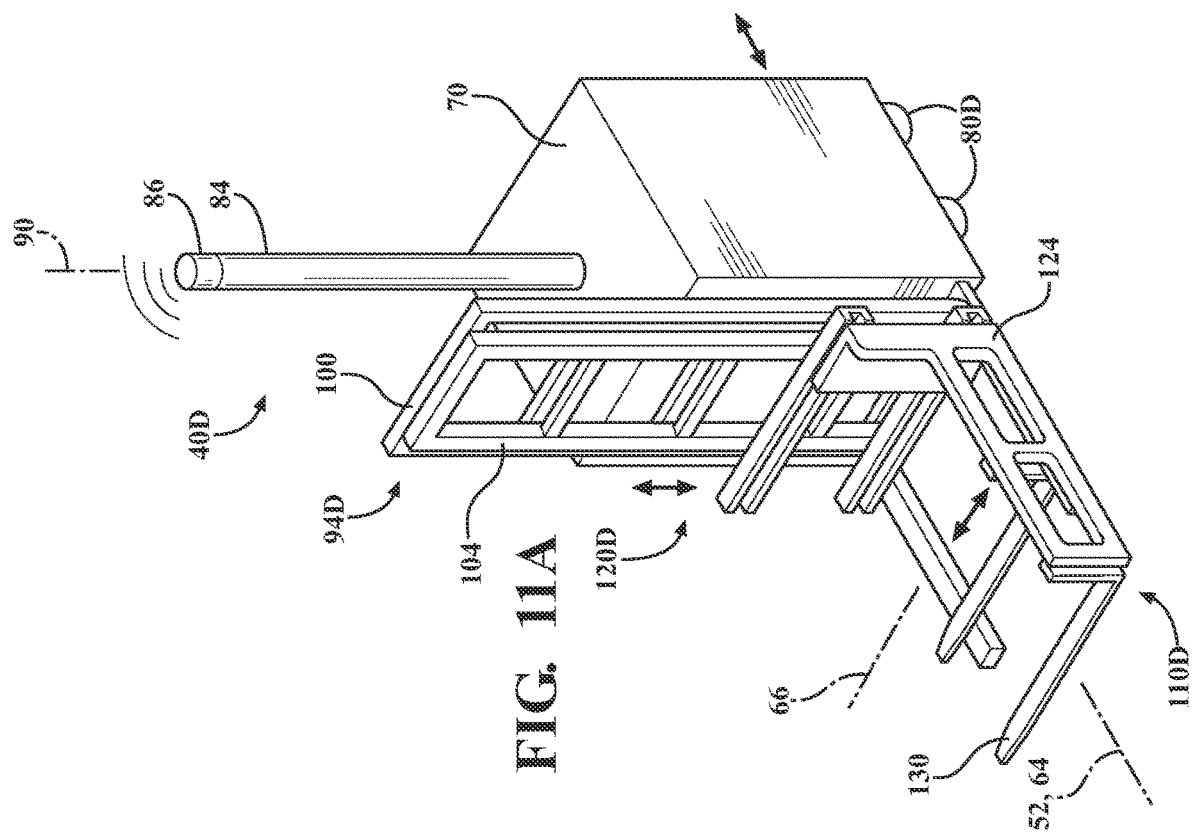

ASSEMBLY MATERIAL LOGISTICS SYSTEM AND METHODS

CROSS-REFERENCE TO RELATED APPLICATIONS

This application claims priority benefit to U.S. Provisional Patent Application Ser. No. 62/910,329 filed Oct. 3, 2019 and U.S. Provisional Patent Application Ser. No. 63/036,172 filed Jun. 8, 2020, the entire contents of both applications incorporated herein by reference.

TECHNICAL FIELD

This disclosure relates to methods and devices useful for material handling and logistics to support product manufacturing and assembly operations.

BACKGROUND

Modern manufacturing and assembly facilities employ sophisticated and highly automated equipment and processes to increase efficiency and end product throughput to meet the increasing demands of customers and end consumers. The adoption of just-in-time material supply, manufacturing and assembly processes require the industrial facilities to be flexible in the products that can be produced while minimizing storage or warehousing of basic materials used in the manufacturing and assembly of products.

As the speed and volume of product production increases through automation, the supply of raw materials used to support the manufacture and assembly processes increases. This creates challenges for manufacturers to logistically move individual components and raw materials from a parts storage area in the facility to the assembly lines for use in the assembly process. Conventional facilities have used manually-driven fork lift devices to move large crates or pallets holding the consumable raw materials and racks holding components from a parts storage area in the assembly facility to the assembly line for use.

When a component crate or rack has been depleted of parts at the assembly line, a fork lift must be sent to the assembly line to retrieve the empty crate and transfer it to another area of the facility to, for example, be sent back to the part manufacturer to be restocked. The same, or another, fork lift must then travel to the parts storage area to retrieve a full crate or rack and transfer it to the assembly line to replace the empty crate or rack just removed. This added time by a transfer device capable of only carrying and/or manipulating one container at a time is time consuming and inefficient. In order to keep with assembly demand, more fork-lifts are needed which increases traffic on the production floor.

Further challenges for the manufactures and assemblers exist in minimizing the assembly facility floor space needed to assemble the products. In conventional facilities, crates of raw materials, for example individual components or mechanical fasteners used in assembling the final product, were positioned in large quantities adjacent to the assembly station or cell and consumed during the assembly process. This storing of excess components and raw materials in the assembly area creates congestion for movement of equipment and personnel in the assembly area and takes up unnecessary floor space. More modern facilities minimize the storage of components and raw materials next to the assembly line, but then suffer disadvantages of conventional devices like forklifts and the slow, one-way providing of full racks and removal of empty racks to the assembly line which can slow production.

Improvements are needed in the logistical supply and transfer of materials to support modern, automated, high-volume production processes.

SUMMARY

Disclosed herein are improved methods and system devices for logistical handling of transfer of components and consumable assembly materials to support assembly or manufacturing operations in a high-volume quantity assembly or manufacturing facility. In one example application, the methods and systems are useful in a high-volume production passenger vehicle assembly facility. The disclosed methods and system devices are equally useful in other applications where rapid supply and transfer of materials used to support product manufacturing and assembly are needed.

In one example of the invention, an assembly facility is provided with a component storage area where components and consumable materials are temporarily stored in a storage rack or other area suitable for the particular components. An exemplary storage rack positions or presents a component container in a rack aisle for transfer to an assembly area. The storage area is positioned logistically upstream of an assembly area where individual components and consumable materials are used in an assembly operation to produce a predetermined product.

A transport vehicle is positioned in and reciprocally travels along a material aisle between the storage area and the assembly area. When positioned in the storage area, the transport vehicle engages for transport a full component container from the rack aisle and secures the full component container on the transport vehicle for transfer to the assembly area. While still in the storage area, the transport vehicle also deposits an empty component container in the storage area that has been removed and transferred from the assembly area.

On securing the full component container on the transport vehicle, and having deposited the empty container in the storage area, the transport vehicle travels along a material aisle toward the assembly area. Once the transport vehicle is positioned in the assembly area, the transport vehicle removes an empty component container from the assembly area rack aisle and replaces it in the assembly rack aisle with the onboard full component container. The empty container is delivered by the transport vehicle to the storage area for deposit and engagement of another full component container.

In one example, the transport vehicle includes a first component container support and a second component container support independently operable from the first container support. This allows for a single transport vehicle to both pick-up and drop off two component containers in a storage or assembly area. In another example, two transport vehicles each with a single container support are coordinated to work and travel in a pair to achieve the dual action or activity described for a transport vehicle having both a first container support and a second container support.

In one example, the transport vehicle is autonomously driven, navigated and actuated through either preprogrammed instructions in the transport vehicle control system or through streaming receipt of wireless data signals from a central or local control system. In another example, the transport vehicle is either semi-autonomous or manually operated by an onboard operator.

The method of use of the disclosed transport vehicle and disclosed facility provides many advantages over prior conventional material handling and transfer processes and devices. The method allows for dual actions or activity by a single transport vehicle (pick up full and drop off empty containers in the storage area, and pick up empty and drop off full containers in the assembly area). While traveling in between the storage area and the assembly area, the transport vehicle is always doing productive work—either transferring a full component container or an empty component container. This further provides an increase in productivity through faster and more efficient supply of materials to support production as well as reduces the footprint or floor space needed for the supply of components needed in the assembly and storage areas.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 11A is a front left perspective view of an alternate example of a component transport vehicle in FIG. 4A.

FIG. 11B is a front left perspective view of an alternate example of a component transport vehicle in FIG. 11A.

DETAILED DESCRIPTION

Referring to FIGS. 1-15 examples of an assembly material logistics system and methods 10 are shown. In one example application, the system and methods are useful in high-volume quantity vehicle assembly facilities. It is understood that the invention has many other applications for the assembly and manufacturing of other products including, but not limited to, consumer products and other commercial and industrial applications.

Figure 1:
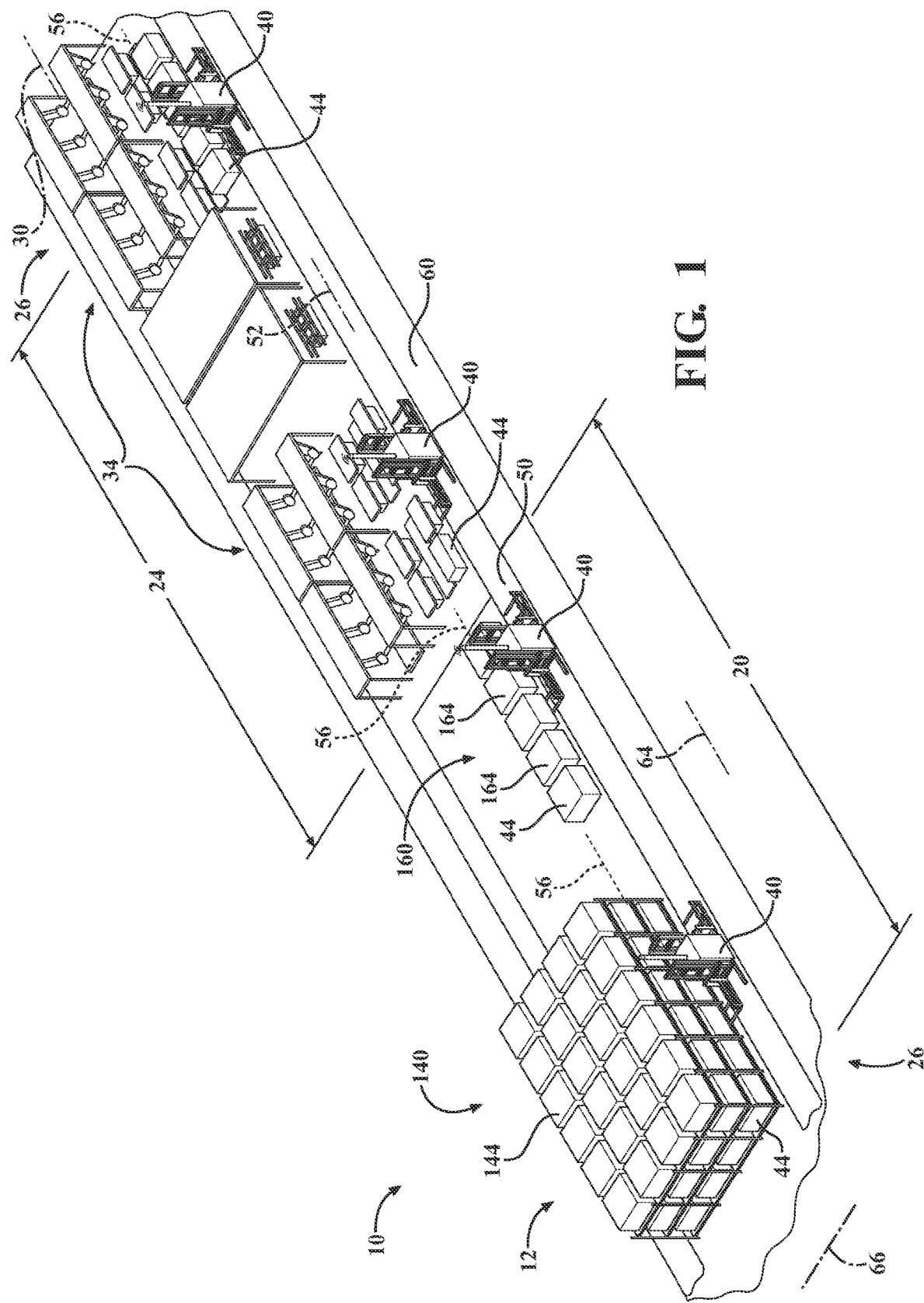
FIG. 1 is a front left perspective view of one example of an assembly facility including one assembly line of the present invention.

Referring to FIG. 1 one example of a floor plan layout of a vehicle assembly facility 12 for use in assembling passenger vehicle bodies, or body-in-white structures, is shown. This example includes the assembly of passenger vehicle sheet metal bodies whereafter powertrain, suspension and interior components are connected to the vehicle body.

Referring to FIG. 1 exemplary facility 12 and system and methods 10 include a marketplace component and container storage area 20 and an assembly area 24 further discussed and illustrated below. In the FIG. 1 example facility 12, assembly area 24 includes a plurality of assembly lines 26 (one assembly line 26 shown) including a path of travel 30 wherein a product, for example a vehicle body, is progressively assembled in a series of sequentially-positioned assembly cells 34. Each assembly cell 34 includes one or more assembly operations, for example welding a component or subassembly to the progressively-built vehicle body by a plurality of programmable multi-axis robots. Although FIG. 1 shows the marketplace storage area 20 in relatively close position, substantially linearly aligned, and upstream of the assembly area 24, it is understood that storage area 20 and the assembly area 24 can be in different locations and orientations with respect to one another inside facility 12 to, for example, accommodate the existing floor footprint of the facility 12 building and existing structures. Other system 10, facility 12, storage area 20, and assembly area 24 locations and configurations to suit the particular application known by those skilled in the art may be used.

Referring to exemplary FIGS. 1 and 2, system and methods 10 use one or more, and in some examples, a plurality of component container transport vehicles 40 to engage and transport full component containers 44 from the storage area 20 to the assembly area 24 and return empty component containers 44 to the storage area 20 as further described and illustrated below. In the exemplary system and methods 10, reference to component containers 44 includes open, or partially or fully-enclosed containers, crates, pallets, platforms, component racks, dunnage, and other structures for supporting and/or containing components. Reference to components includes individual components or parts, sub-assembled components, consumable assembly materials, and/or other items used directly in the assembly process, or used indirectly by the equipment or operators to support the assembly operations. It is understood that containers may contain a single component or part, or multiple components.

It is understood that consumable assembly materials may include a broad range of materials used in the assembly process, for example fasteners, adhesives, paints, sealants, lubricants, other fluids, and other items used directly in the assembly process to suit the particular application and/or known by those skilled in the art. Consumable assembly materials may also include materials that are used by equipment or operators to support or maintain the assembly process and/or assembly equipment including water, lubricants, consumable welding or material joining materials, and other physical items and fluids used in assembly processes known by those skilled in the art. The containers may be full, partially full or empty/depleted of components. As used herein, a full component container may be any of the containers described including one or more of any of the components described. As used herein, an empty or depleted component container may be any of the containers described which is empty or depleted of any of the components described, or depleted to such an extent that the particular exemplary production process deems the container to effectively be empty and/or in need of replacement. As used herein, the term container may refer to a component container (full or empty) or just a component itself (for example, where a container is not necessary for storage, transport or assembly of the component).

Figure 2:
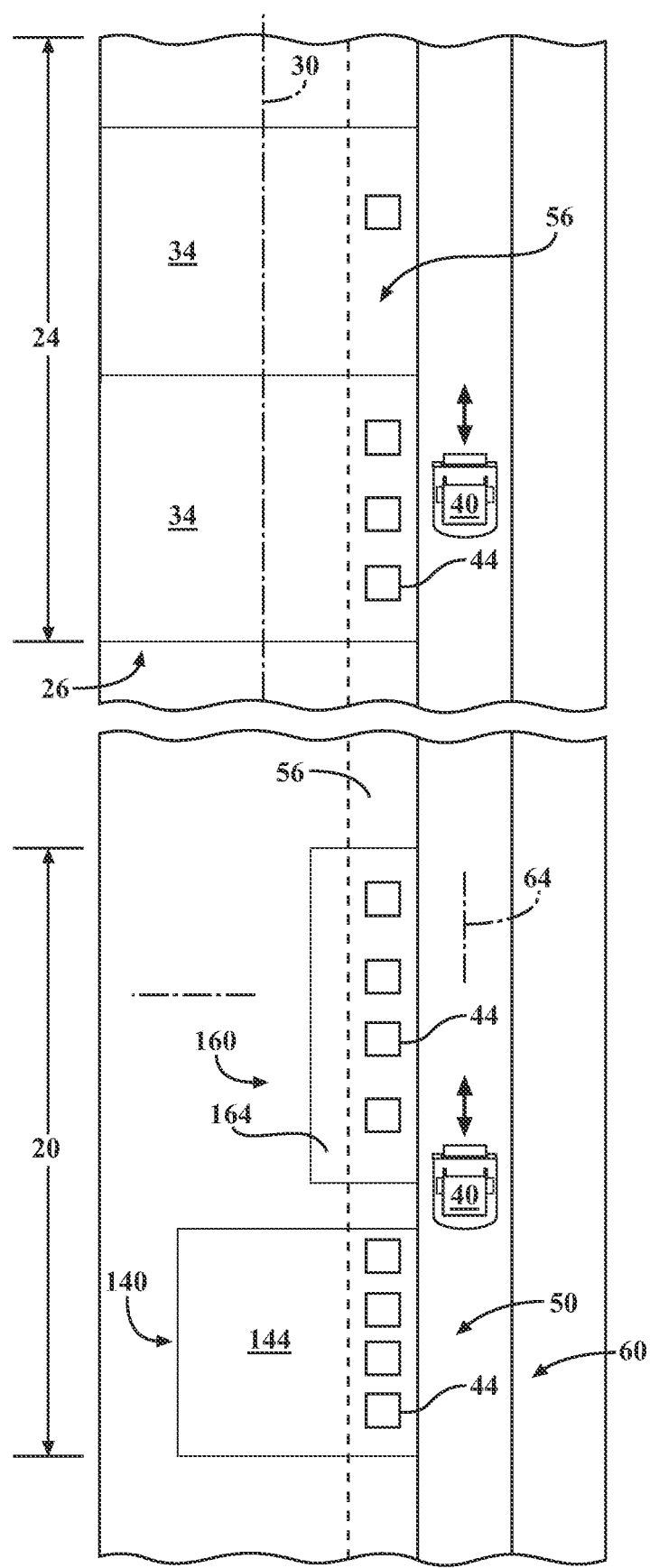
FIG. 2 is a schematic top view of the example in FIG. 1.

As best seen in FIGS. 1 and 2, exemplary system and methods 10 includes a material aisle 50, a rack or component container aisle 56, and a pedestrian aisle 60 as generally shown. In the examples shown, and as more fully described and illustrated below, rack aisle 56 is an aisle, path or area wherein component containers 44 are positioned and temporarily stored in the storage area 20 and assembly area 24 within engageable reach or extension of the transport vehicles 40 positioned in and movable along the material aisle 50. As best seen in FIGS. 1 and 2, in a preferred but not exclusive example, rack aisle 56 extends in an x-coordinate direction 64 from the storage area 20 through at least a portion of the assembly area 24, directly adjacent to assembly cells 34. In the preferred example, rack aisle 56 is continuous and/or substantially linear from the storage area 20 through the assembly area 24. In one example, rack aisle 56 is substantially parallel to the assembly line 26 path of travel 30.

Still referring to FIGS. 1 and 2, exemplary material aisle 50 is an aisle, path or area positioned directly adjacent to rack aisle 56, and substantially parallel thereto, extending in the x-coordinate direction 64. As discussed and illustrated further below, material aisle 50 is of sufficient width to allow transport vehicles 40 to travel along the path between the storage area 20 and the assembly area 24. In the example shown, material aisle 50 is substantially straight or linear and aligned with the rack aisle 56. In one example, the width of material aisle 50 in a y-coordinate direction 66 is only wide enough to accommodate a single transport vehicle 40 (not wide enough for two transport vehicles side-by-side) to minimize the facility 12 floor area footprint. In another example (not shown), material aisle 50 is of sufficient width to allow two or more transport vehicles 40 to travel side-by-side in the y-direction 66 to, for example, navigate and travel around other transport vehicles 40 positioned in material aisle 50.

Exemplary system and method 10 further includes a pedestrian aisle 60 for use in allowing personnel operators and technicians to walk or travel along the storage area 20 and assembly area 24 without impeding travel of the transport vehicles 40 moving along the material aisle 50. In one example (not shown), pedestrian aisle 60 is not included in system 10. In another example (not shown), aisle 60 may be used for other purposes as known by those skilled in the art.

Figure 3:
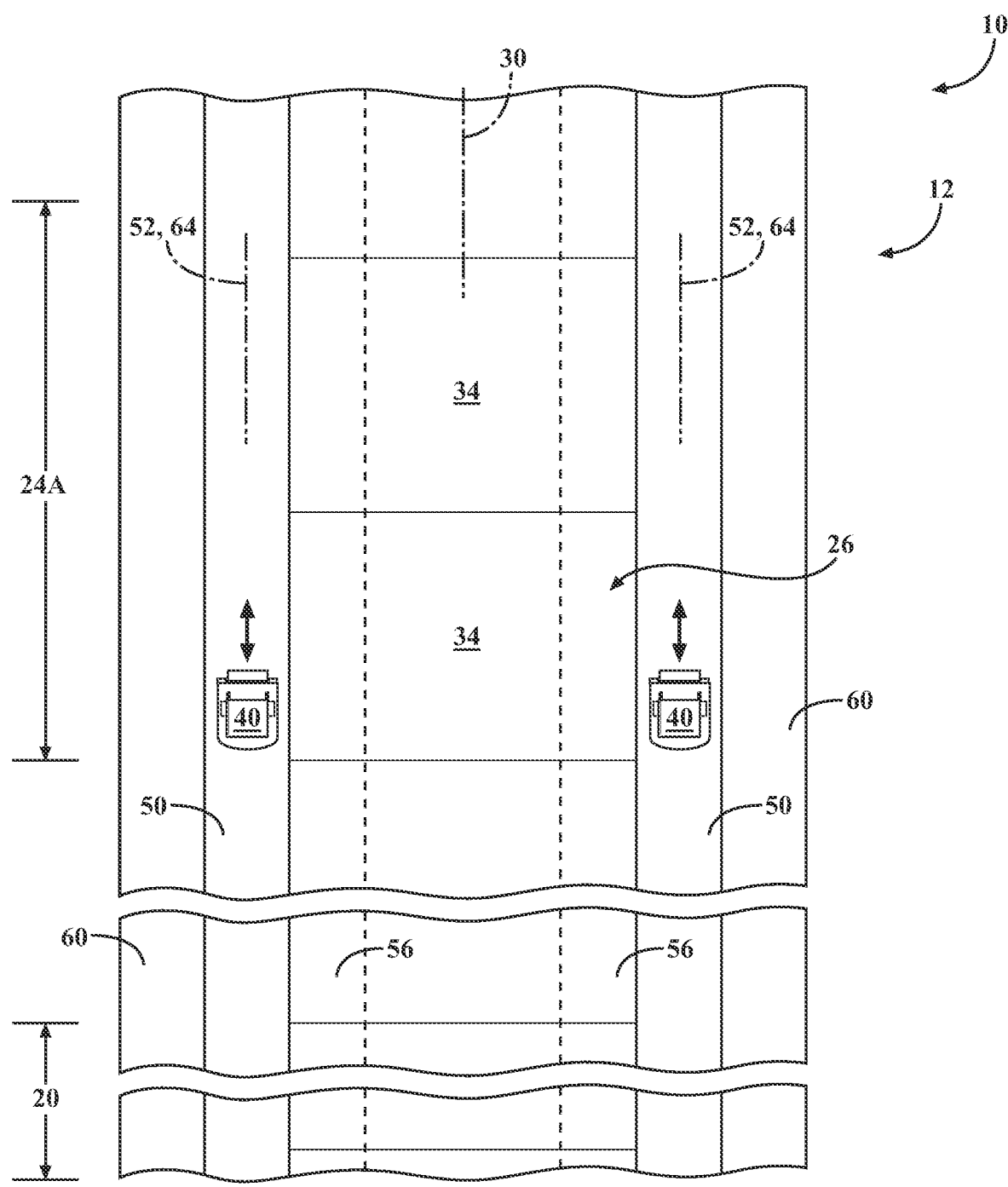
FIG. 3 is a schematic top view of an alternate example of FIG. 1.

Referring to FIG. 3, an alternate example of system and methods 10 and facility 12 is shown. In the example the storage area 20 is positioned toward an upstream end of assembly area 24 as generally shown. Material aisle, 50, rack aisle 56 and pedestrian aisle 60 are positioned on both sides of assembly area 24. This example allows component containers 44 to be transported and positioned on both opposing sides of the assembly area 24 as generally shown. It is understood that alternate constructions, positions, configurations and/or orientations of facility 12, storage area 20, assembly area 24, material aisle 50, rack aisle 56, and pedestrian aisle 60 may be used to suit the application and performance requirements of the facility 12 and product production as known by those skilled in the art.

Figure 4B:
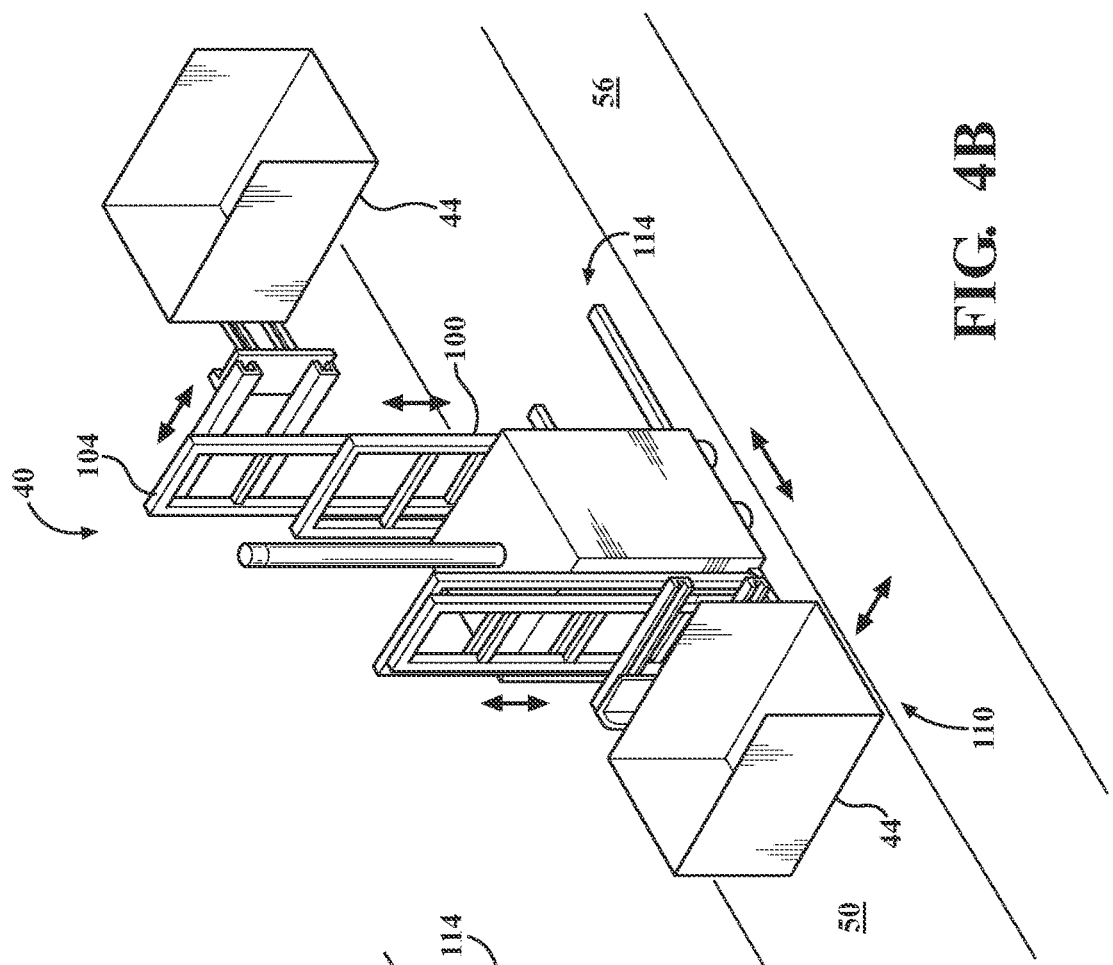
FIG. 4B is a front left perspective view of the component container transport vehicle in FIG. 4A with one of container supports in a raised and extended position.
Figure 4A:
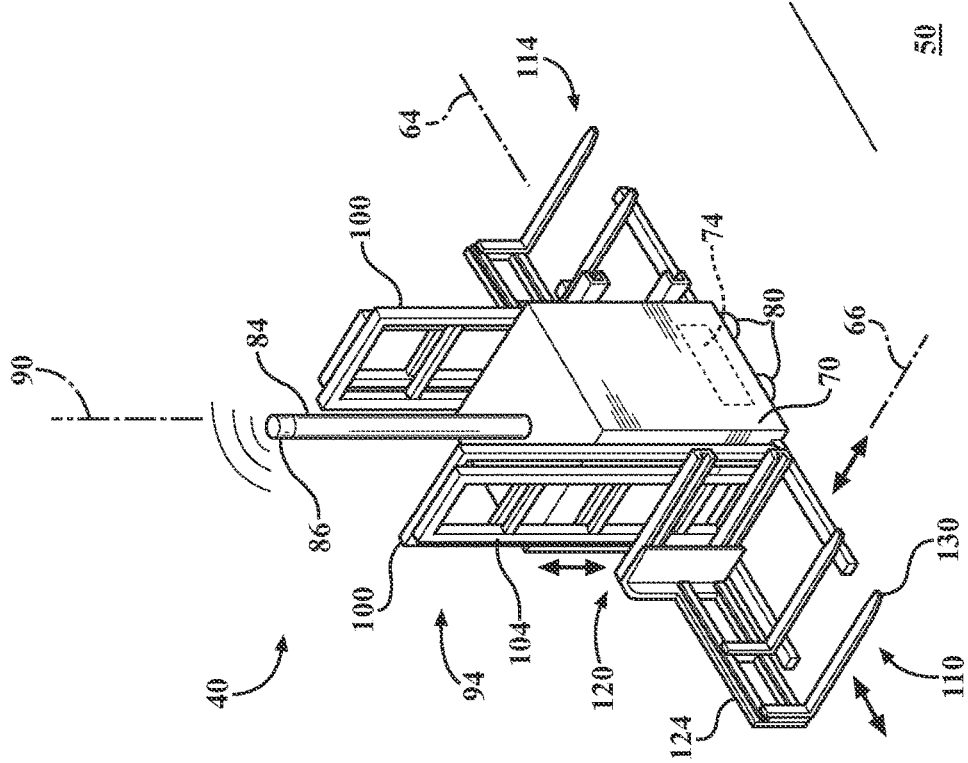
FIG. 4A is a front left perspective view of one example of a component container transport vehicle in a non-extended position.

Referring to FIGS. 4A and 4B, an example of an autonomous transport vehicle 40 operable to engage, transport and deposit component containers 44 along the material aisle 50 are shown. Exemplary transport vehicle 40 includes a body or housing 70 including a rigid, load-bearing internal frame (not shown). Transport vehicle 40 includes an onboard control system 74 including the components generally shown and described further below in FIG. 13. Control system 74 controls the transport vehicle 40 internal operations, movement or propulsion, and navigation along path of travel 52 in material aisle 50 as further described below and illustrated.

Transport vehicle 40 body 70 includes one or more powered wheels 80 used to propel transport vehicle 40 along the predetermined path of travel 52. Each powered wheel 80 is engaged to a wheel drive device, for example an electric motor actuator 308 (schematically shown in FIG. 13) which is in communication with control system 74 to selectively supply drive motion to predetermined wheels 80. In one example, one or more wheels 80 may be omni-directional wheels allowing the transport vehicle 40 to rotate about a vertical axis or z-coordinate direction 90, move laterally in a horizontal or y-coordinate direction 66 transverse to the x-coordinate direction 64, or other complex movements, for example along a curvilinear path. One or more wheels 80 may be idler wheels. The actuators 308 are supplied power from a power source 316 (FIG. 13), for example a rechargeable battery. Other power sources 316, and control and drive mechanisms, known by those skilled in the art may be used.

Figure 13:
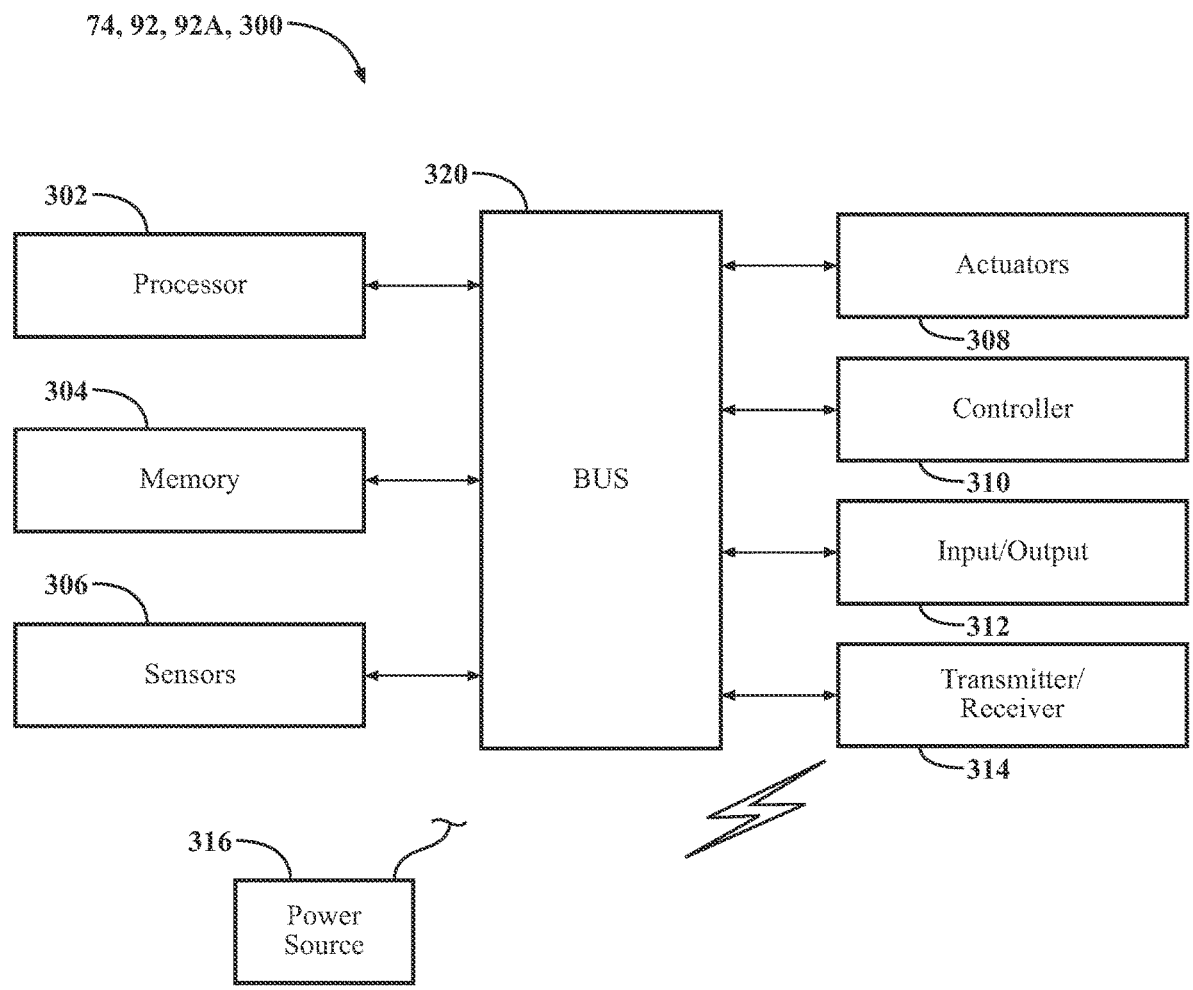
FIG. 13 is a schematic illustration of one example of a control system useful with the present invention.

In the FIGS. 4A,B example, transport vehicle 40 is autonomously driven and navigationally guided through use of a wireless digital data communication and navigation system including a transmitter/receiver antenna 84, 314 and one or more sensors 86, 306 (see FIG. 13). In one example, transport vehicle 40 includes onboard software and programmed instructions in the onboard control system 74 which allow the vehicle to autonomously (without direct personnel involvement or intervention) move along material aisle 50 and selectively engage and deposit component containers 44 as generally described herein to support the assembly build operations. In another example best seen in FIG. 14, each transport vehicle 40 directly receives real-time, streaming wireless digital data signals from a local 92 or central control system 92A which is processed by the vehicle 40 onboard control system 74 which is used to move and navigate vehicle 40 through predetermined movements and operations as generally described herein.

Figure 10:
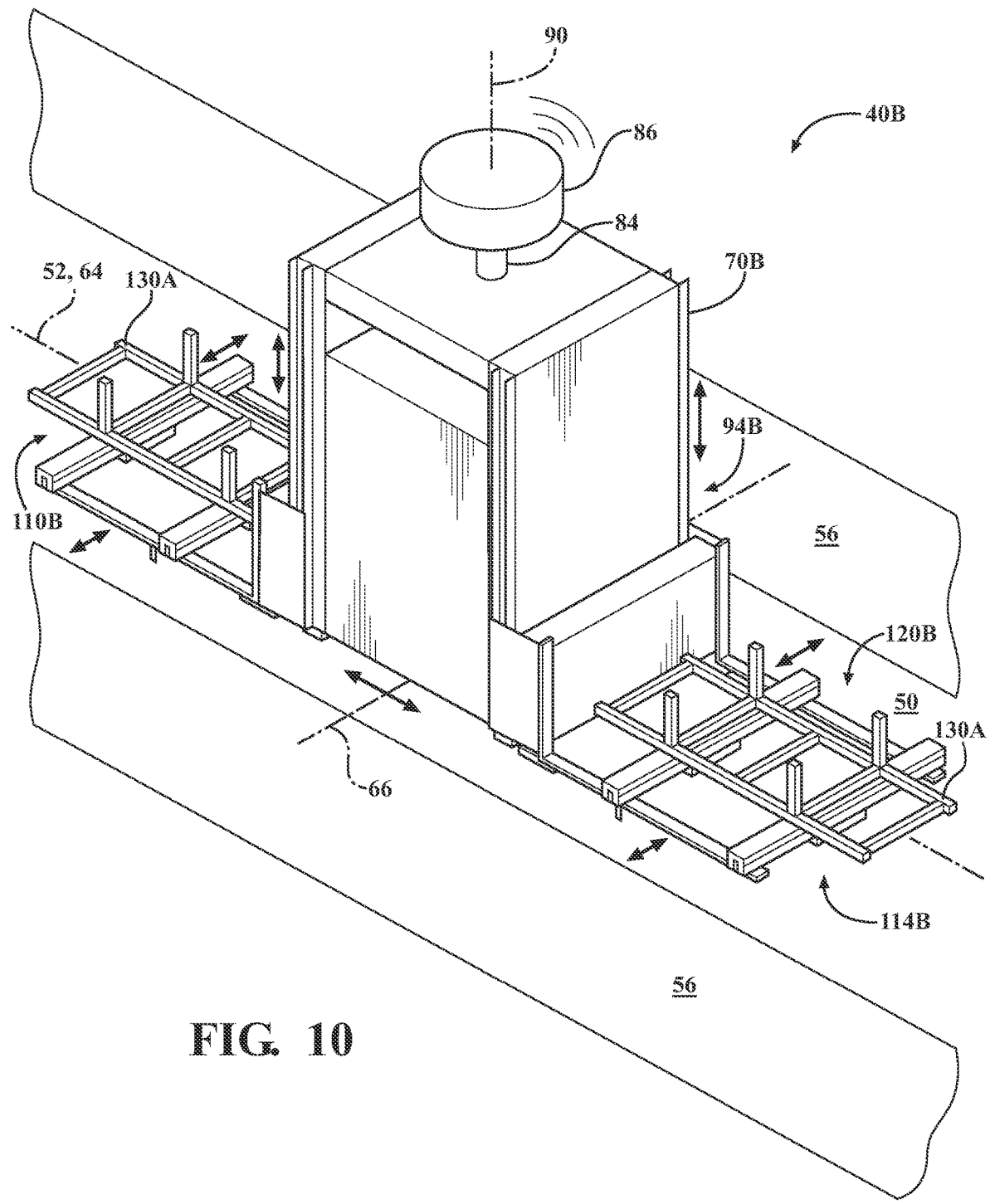
FIG. 10 is a front right perspective view of an alternate example of a component transport vehicle in FIG. 4A.
Figure 10A:
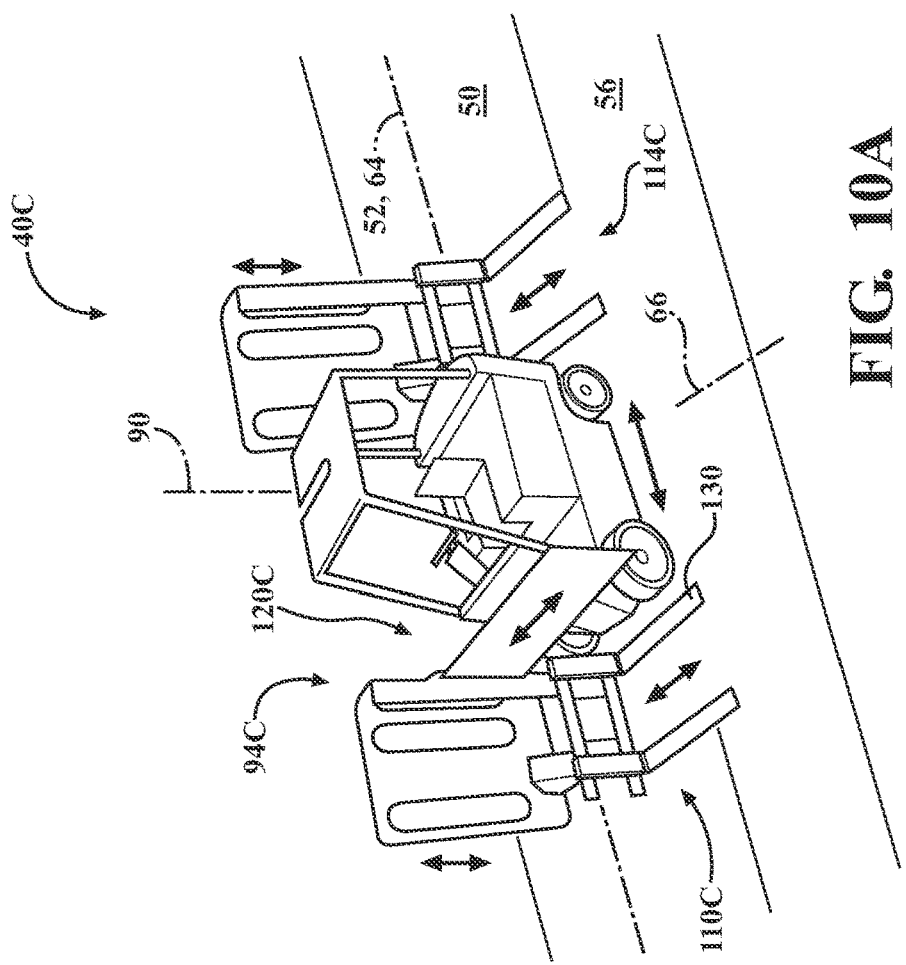
FIG. 10A is a front right perspective view of an alternate example of a component transport vehicle in FIG. 4A.
Figure 11C:
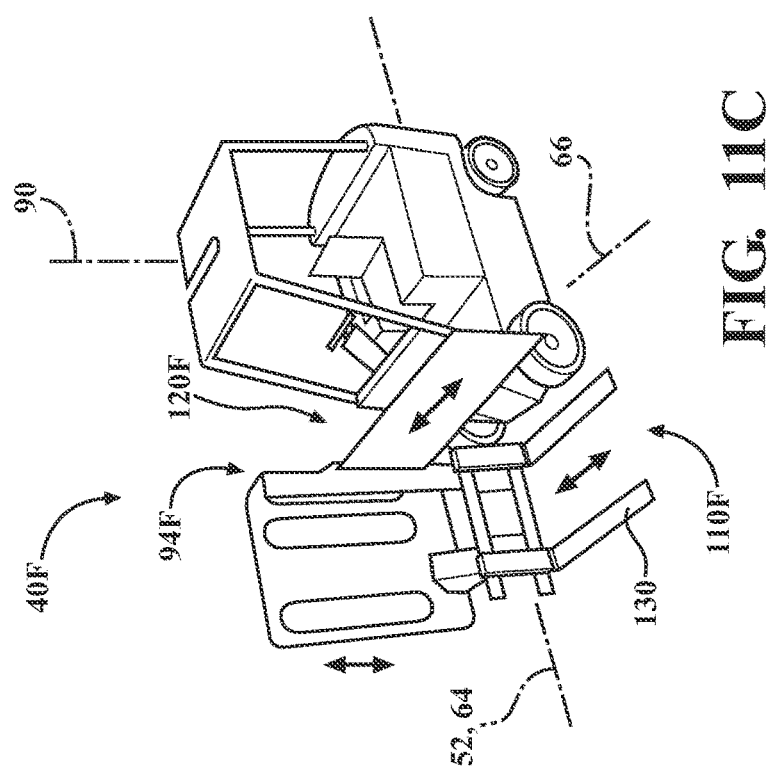
FIG. 11C is a front left perspective view of an alternate example of a component transport vehicle in FIG. 11A.

It is understood that any of the transport vehicles 40 described herein may be configured to be semi-autonomous in operation. For example as shown in FIGS. 10A and 11C, vehicle 40 may be configured to support a human operator onboard the body 70 to supervise and/or manually operate certain functions of the vehicle 40 as described herein. As used herein, autonomous and semi-autonomous operation is collectively referred to as autonomous unless expressly identified. In an alternate example which also may be configured the same or similar to FIGS. 10A and 11C, transport vehicle 40 may be a manually-operated device wherein the functions, movement and navigation are controlled by an operator or technician.

In one example or mode of operation as best seen in FIGS. 1 and 2, transport vehicle 40 is generally limited to straight, linear movement along the path of travel 52 in the x-coordinate direction 64 on the material aisle 50 between the storage area 20 and the assembly area 24. It is understood that an alternate mode of operation or movement may allow the vehicle 40 to move omni-directionally, laterally, curvilinearly, and/or to negotiate turns like a manually-operated conventional forklift, to, for example, travel off or away from material aisle 50 for maintenance, recharging, reprogramming or other activities as known by those skilled in the art. In an example where facility 12 is not configured in a generally straight linear manner as shown in FIG. 1, transport vehicles 40 are operable to move along alternate paths to suit the particular orientation of facility 12 and production operations.

Still referring to the FIG. 4A example, a vertical or first drive device 94 is used to selectively raise and lower along a vertical or z-coordinate direction 90, a container first support 110 relative to the body 70. In the FIG. 4A example, vertical or first drive 94 includes a first vertical guide 100 rigidly connected to the body 70 frame, and a second vertical guide 104 engaged with the first vertical guide 100 and moveable vertically in the z-direction 90 relative thereto. Engagement of the second vertical guide 104 to the first vertical guide 100 may be made by one of many conventional ways for example rollers, complimentary gears, rack and pinion, and other devices known by those skilled in the art. In one example, a rotary gear is connected to a first vertical guide 100 (or the body 70) and an electric motor actuator 308 in communication with control system 74 to selectively activate and deactivate the motor to move the second vertical guide 104 up and down in the vertical or z-direction 90, relative to the body 70. Encoders and/or other sensors in communication with the control system 74 may be used to determine and monitor the position and movement of the vertical first drive device 94 and the individual parts.

Exemplary transport vehicle 40 further includes a first component container support 110 and a second component container support 114 positioned on an opposing side of body 70 as generally shown. Referring just to the first component container support 110 for ease of description, first support 110 (or alternately body 70) includes a horizontal or second drive device 120 operable to selectively move the first support 110, or portions thereof, laterally along the y-coordinate direction 66 relative to body 70. In one example, the y-direction 66 is substantially horizontal and transverse to x-coordinate direction 64. The second drive 120 may include the same or similar components described for vertical drive 94, or other devices known by those skilled in the art.

Exemplary vehicle 40 first support 110 further includes a backplate structure 124 rigidly engaged with the second drive 120 and a pair of forks 130 connected to the backplate 124. The backplate 124 is engaged with the second drive 120 to selectively move first support 110 along the y-direction 66 relative to the body 70 as further described below and illustrated. It is understood that different constructions and configurations of first support 110 may be used to suit the particular application as known by those skilled in the art.

In one example, forks 130 are similar to traditional forklift forks useful to engage pallets and industrial dunnage racks having corresponding openings. It is understood that as an alternative to forks 130, or other structures connected to the forks 130 such as fixtures or other tooling (for example as shown in FIG. 10 described below) may be used to suit the particular component container 44 or component to be engaged and transported by transport vehicle 40. In the example FIG. 4A, second support 114 is similarly constructed as first support 110. It is understood that first support 110 and second support 114 may have different constructions or configurations from one another on a particular transport vehicle 40.

In the example vehicle 40 as shown, and as further described below and illustrated in FIG. 4B, both first 110 and second supports 114 are able to selectively and independently rise and lower along z-direction 90, and extend in the y-direction 66. In one example, both first 110 and second 114 supports face, or open, to only one side of the body 70 (toward rack aisle 56 as shown). In one example (not shown), one of the first 110 or second 114 supports can be oriented 180 degrees about the z-direction 90 and extend to the opposite side of body 70 (opposite the direction as the other support). This would provide flexibility to service storage racks, or rack aisles 56, positioned on both sides of material aisle 50, or for example, in an alternately configured storage area with component racks on both sides of a material aisle 50. Alternate constructions, configurations and orientations of the first 110 and second 114 supports, and transport vehicle 40, may be used to suit the particular container 44 and/or the application as known by those skilled in the art.

Figure 9:
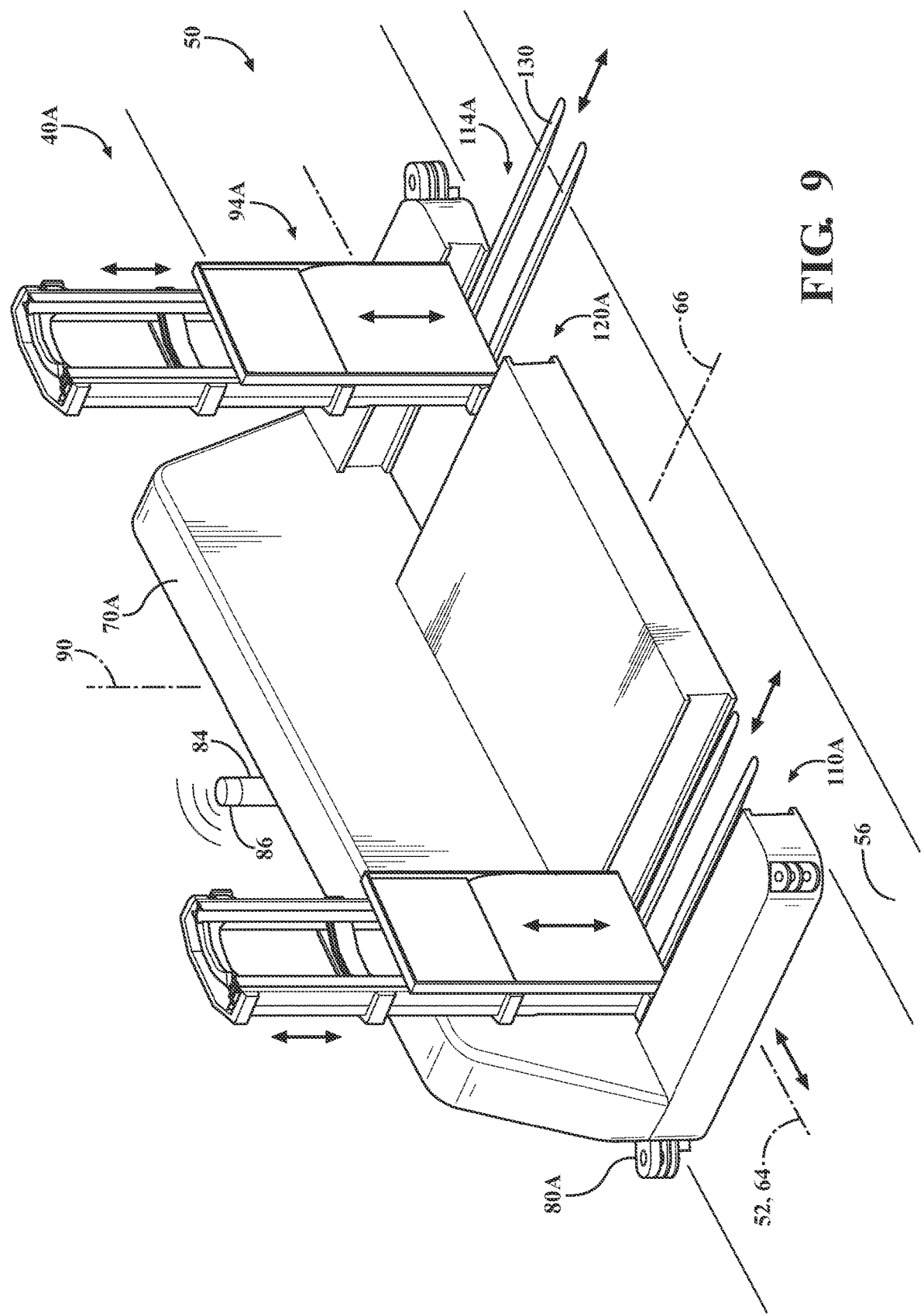
FIG. 9 is a front left perspective view of an alternate example of a component container transport vehicle in FIG. 4A.

As used herein, like reference numerals refer to similarly constructed or functioning structures. Like reference numerals with a following character refer to similar base device or part, but with alternate construction and/or function. Referring to FIGS. 9, 10 and 10A, alternate transport vehicles 40A, 40B and 40C including a first 110 and second 114 supports are shown. Referring to FIG. 9, alternate and exemplary transport vehicle 40A is configured to be an autonomous drive and navigation device as generally described above for transport vehicle 40 (FIG. 4A). Exemplary transport vehicle 40A includes an alternately configured body 70A, control system 74, vertical or first drive device 94A, horizontal or second drive device 120A, and first 110A and second 114A supports as generally shown. Transport vehicle 40A is configured with forks 130 as described for transport vehicle 40.

Referring to FIG. 10, alternate and exemplary transport vehicle 40B is configured to be an autonomous drive and navigation device as generally described for transport vehicle 40 as described above. Exemplary transport vehicle 40B includes an alternately configured body 70B, control system 74, vertical or first drive device 94B, horizontal or second drive device 120B, and first 110B and second 114B supports as generally shown. Transport vehicle 40B first 110B and second 114B supports are alternately configured with tooling or fixtures 130A then traditional forks 130. In one example, tooling 130A is specifically configured to engage and support a specific container 44 or component. In one example, transport vehicle 40B first 110B and second 114B supports, or a portion thereof, are extendible along y-direction 66 to both opposing sides of body 70B to, for example, engage and deposit containers 44 in storage areas 20 and assembly areas 24 positioned on both sides of a material aisle 50. Transport vehicle 40B may also include semi-autonomous operation and functions which are supervised by an onboard operator as alternately described for transport vehicle 40.

Referring to FIG. 10A, alternate and exemplary transport vehicle 40C is configured to be a manually driven and navigated device as generally described above. Exemplary transport vehicle 40C includes an alternately configured body 70C, control system 74, vertical or first drive device 94C, horizontal or second drive device 120C, and first 110C and second 114C supports as generally shown. Transport vehicle 40C is configured with forks 130 as described for transport vehicle 40. In the example, an operator may manually drive, navigate and operate the drives 94B, 120B to engage and deposit containers 44 in the storage 20 and assembly 24 areas as generally described for transport vehicle 40. Transport vehicle 40C may also include semi-autonomous operation and functions which are supervised by an onboard operator as alternately described for transport vehicle 40.

Referring to FIGS. 11A, 11B and 11C, alternate transport vehicles 40D, 40E and 40F including a single first support 110 are shown. As noted below, in one example of system and method 10, a pair of transport vehicles, for example 40D, may collectively and coordinatingly operated together to achieve the benefits of engaging, transporting and depositing containers 44 as described for transport vehicle 40. Referring to FIG. 11A, alternate and exemplary transport vehicle 40D is configured to be an autonomous drive and navigation device as generally described above for transport vehicle 40. Exemplary transport vehicle 40D includes an alternately configured body 70D, control system 74, vertical or first drive device 94D, horizontal or second drive device 120D, and first support 110D as generally shown. Transport vehicle 40A is configured with forks 130 as described for transport vehicle 40.

Referring to FIG. 11B, alternate and exemplary transport vehicle 40E is configured to be an autonomous drive and navigation device as generally described for transport vehicle 40 as described above. Exemplary transport vehicle 40E includes an alternately configured body 70E, control system 74, vertical or first drive device 94E, horizontal or second drive device 120E, and first support 110E as generally shown. Transport vehicle 40A is configured with forks 130 as generally described for transport vehicle 40.

Referring to FIG. 11C, alternate and exemplary transport vehicle 40F is configured to be a manually driven and navigated device as generally described above. Exemplary transport vehicle 40F includes an alternately configured body 70F, control system 74, vertical or first drive device 94F, horizontal or second drive device 120F, and a first support 110F as generally shown. Transport vehicle 40F is configured with forks 130 as described for transport vehicle 40. In the example, an operator may manually drive, navigate and operate the drives 94F, 120F to engage and deposit containers 44 in the storage 20 and assembly 24 areas as generally described for transport vehicle 40. Transport vehicle 40F may also include semi-autonomous operation and functions which are supervised by an onboard operator as alternately described for transport vehicle 40. It is understood that alternate transport devices 40B-40F may be alternately structured, configured and function to suit the particular application as known by those skilled in the art.

Figure 5:
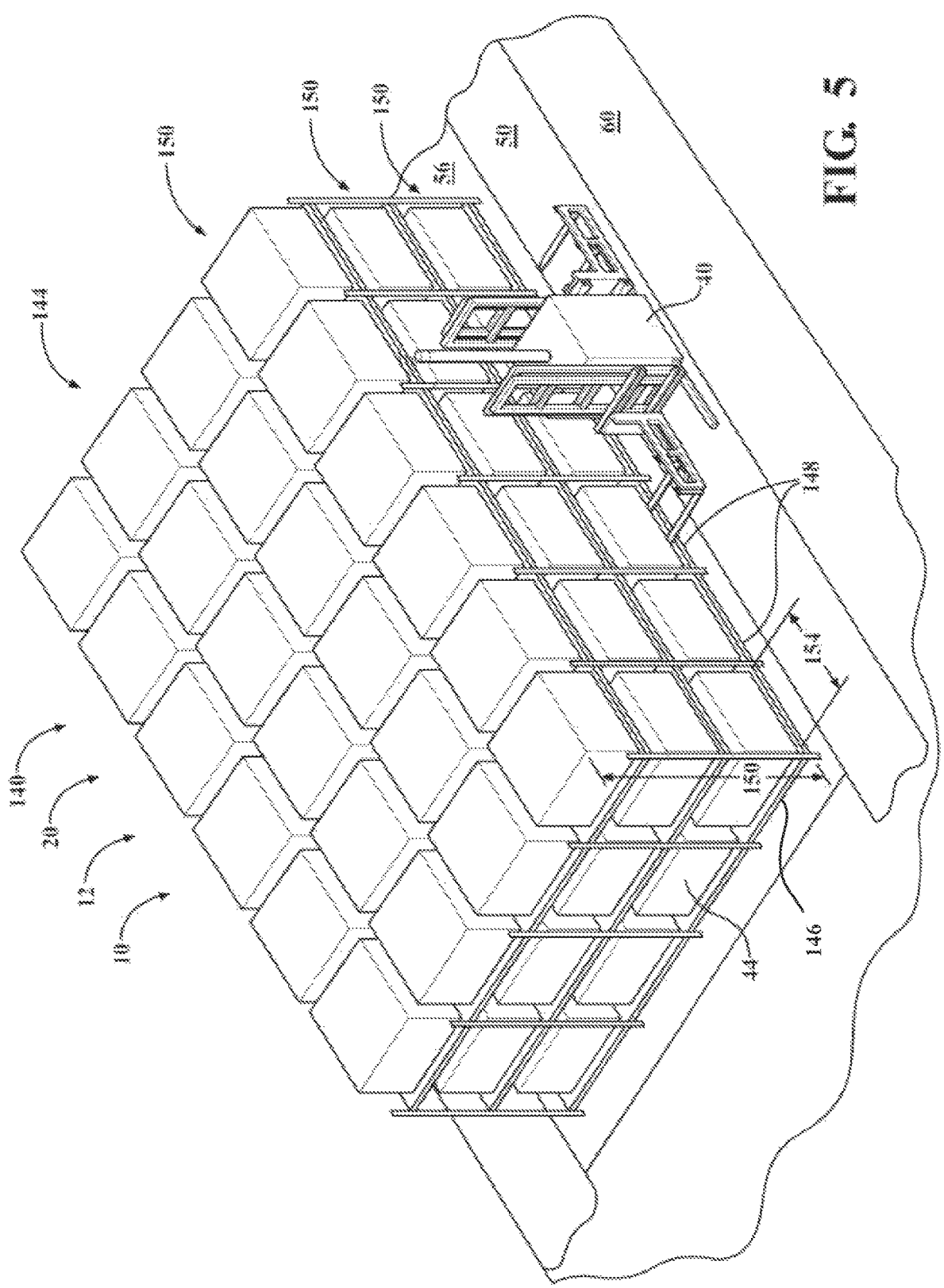
FIG. 5 is a front left perspective view of an example of a component container rack in a storage area useful with the present invention.
Figure 6:
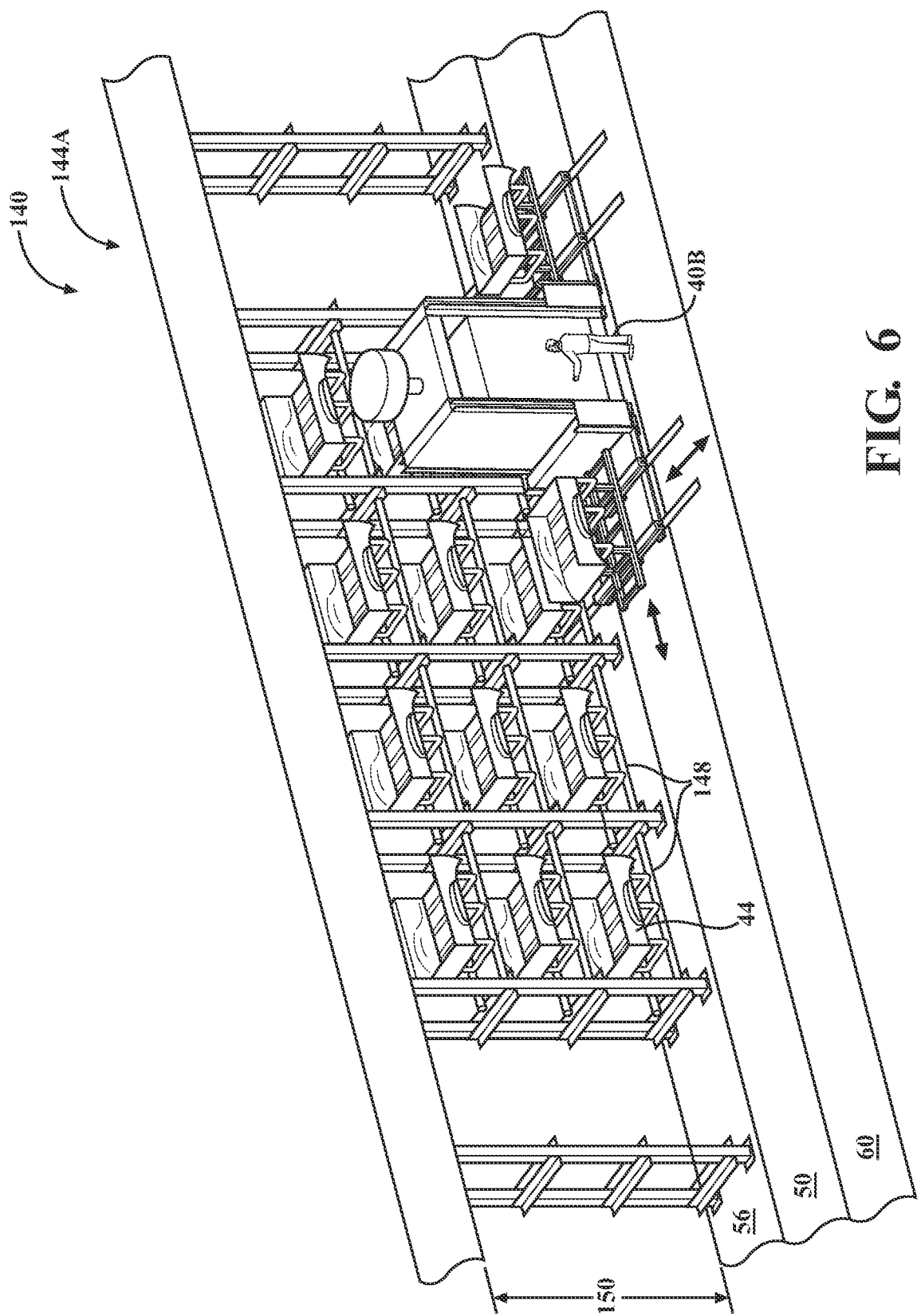
FIG. 6 is a front left perspective view of an alternate example of a component container rack in a storage area useful with the present invention.

Referring to FIGS. 1, 5 and 6, alternate examples of marketplace storage area or storage area 20 is shown. In the FIG. 5 example, a large component container area 140 including a large component rack 144, useful for storing and queueing a plurality of large-sized component containers 44 (all containers generally referred to as 44). Large component containers 44, are generally useful for storing larger-sized components which, for example, are typically housed in custom storage racks or dunnage (containers), for example passenger vehicle door panels or vehicle body sub-assemblies. Other large components may be stored in large component containers 44.

In the example, storage rack 144 includes a load bearing frame including vertical supports and shelves 146 which divide the rack 144 into a plurality of bays 148 extending from a presentation row(s) and column(s) 150 positioned in the rack aisle 56 and directly adjacent to the material aisle 50. In the example large rack 144, each bay 148 includes a width 154 and height sufficient for passage of large component containers 44 to pass through and the transport vehicle 40 container supports 110, 114, or portions thereof such as forks 130 to, engage the component containers 44 as further discussed and illustrated below.

In one example of storage area 20, using large component rack 144 as an example, large component rack 144 includes separate and predetermined areas, or selected bays 148, for temporary storage of full containers 44 intended for transport to assembly area 24, and separate predetermined bays 148 for empty containers 44 that have been returned from assembly area 24 for restocking. The large component rack 144 may include devices which automatically or manually move or queue the containers in the rack to, for example, automatically advance a full container 44 to the presentation row 150 for engagement by a transport vehicle 40. One or more sensors may be used to detect and monitor the positions of containers 44 in the respective component rack and/or bays 148. In one example, the sensors may send signals to a local 92 and/or central 92A control system to actively monitor and/or coordinate activity with the transport vehicles 40 and other system 10 equipment. Other devices and methods for logistically managing full containers 44 and empty containers 44, known by those skilled in the art may be used to suit the particular application.

Referring to FIG. 6, an alternate example of a large component rack 144A is shown with an alternately configured transport vehicle 40 (see FIG. 10). It is understood that large part racks 144 may be alternately constructed or configured to suit the particular containers 44 and the application as known by those skilled in the art.

Referring to FIGS. 1 and 2, in one example of storage area 20, additional or alternate storage areas 20 are included other than large component area 140. In one example, additional storage areas, for example a small container or consumable materials area 160, includes a small container rack 164 for smaller component containers 44. Each additional or alternate storage area 160 is positioned adjacent to the material aisle 50 thereby presenting or positioning the particular component container 44 in rack aisle 56 in a presentation row 150 so as to be reachable and engageable by the transport vehicle 40 traveling in material aisle 50 as described for the large component area 140 and large part rack 144. It is understood that some containers 44, and their respective storage areas, may not need vertical and/or three-dimensional racks such as container racks 144 and 164. Some containers 44, and/or their respective components, may be positioned on conventional pallets and/or supported by the facility floor, for example industrial drums of adhesive. The additional or alternate storage areas may employ similar or alternate devices and processes for logistically managing full and empty containers as described above.

Although the alternate storage areas 140 and 160 are shown in close proximity to one another upstream of assembly area 24, it is understood that the different storage areas 140 and 160 may be positioned in separate and remote areas of facility 12 relative to each other and/or assembly area 24.

Referring to FIGS. 1 and 2, system and methods 10 includes an assembly area 24 with one or more assembly lines 26, and sequentially positioned assembly cells 34 as described above (one assembly line 26 and two assembly cells 34 shown in FIGS. 1 and 2). In the example assembly area 24, rack aisle 56 extends into at least a portion of, and in the example shown extends all through the assembly area 24. In one example, the rack aisle 56 extends substantially linearly straight from the storage area 20 through the assembly area 24 as generally shown. In one example, the rack aisle is continuous. In the example described and shown, the rack aisle 56 is positioned directly adjacent and parallel to the material aisle 50 and is further positioned adjacent, or in communication with each assembly cell 34.

Referring to FIG. 3, an alternate assembly area 24A is shown where aisles 50, 56 and 60 are positioned on both sides an assembly line 26 as described above. It is understood that additional assembly lines 26 may be used in system and method 10. It is further understood that assembly area 24, assembly cells 34, and rack aisle 56 may have alternate constructions, configurations and/or orientations to suit the particular facility and production process as known by those skilled in the art.

Referring to FIGS. 1, 7, 8A-C, and 15, system and methods 10 includes method 200 for assembly material logistics and handling. As described above, method 200 may be used in a manufacturing or assembly facility, and is particularly, but not exclusively, useful in high-volume quantity assembly facilities. Many other applications exist where product packaging and/or distribution logistics require temporary storage and transfer of components, packages and containers to another area of a facility for further processing (collectively referred to as assembly material logistics).

In one example, method 200 is useful in facility 12, having the exemplary storage area 20; assembly area 24; one or more, or a plurality of transport vehicles 40; a material aisle 50; rack aisle 56; and pedestrian aisle 60 as described and illustrated above, and further below. In an exemplary step 205, a component transport vehicle 40 is positioned on a material aisle 50 adjacent to a rack aisle 56. Rack aisle 56 extends through at least a portion of the storage area 20 and a portion of the assembly area 24 as described and illustrated above. In a preferred example step 205, transport vehicle 40 includes a first container support 110 and a second container support 114 as generally shown in FIGS. 4A,B. It is understood that alternately configured transport vehicles 40 including a first 110 and second 114 supports may be used, for example those illustrated in FIGS. 9, 10, and 10A, as well as FIGS. 11A-11C, and others not illustrated, may be used.

In exemplary step 205, in a common facility 12 condition where assembly area 24 and assembly line 26 are in operation and there is an empty container 44 in need of replacement, transport vehicle 40 is moved along material aisle 50 to a position in storage area 20 to engage a full container 44, for example positioned in a large storage rack 144 (see FIGS. 1 and 5). In an example where transport vehicle 40 is autonomous, movement of transport vehicle 40 is autonomously moved and positioned to a predetermined rack 144 bay 148 which includes a full container 44 of the correct component to replace the empty container 44 in the assembly area 24.

As generally described above, transport vehicle 40 may include preprogrammed instructions stored in a data memory storage device 304 in control unit 74 so as to direct movement of actuators 308 which drive or propel wheels 80 to move to the predetermined location or rack bay 146 in storage area 20. On receipt of a wireless or other signal from a local 92 or central 92A control system, vehicle control system 74 accesses and executes the stored in memory preprogrammed instructions through processor 302 and controller 310 to execute the instructions and move the vehicle to the predetermined bay 148. Sensors 86, 306 onboard the transport vehicle 40, in communication with the control system 74, may assist in navigating and positioning transport vehicle 40 in the predetermined position in the storage area 20 relative to large rack 144 and/or bay 148. Additional or alternate sensors (not shown) in the storage area 20, and/or large rack 144, in communication with the local 92 and/or central 92A control systems, and/or the transport vehicle control system 74, may also be used to positively and accurately positon transport vehicle 40 relative to bay 148 and/or the correct full container 44 to be engaged and transported.

In an alternate example described above, transport vehicle 40 may receive real time streaming wireless data signals from the local 92 and/or central 92A control system which provide the predetermined location(s) in storage area 20, movement of transport vehicle 40 along material aisle 50, and navigation along material aisle 50. In an alternate example of step 205, where the transport vehicle 40 is semi-autonomous or manually operated, an individual operator may manually propel, navigate and/or position the transport vehicle 40 to the predetermined position in storage area 20.

Figure 7:
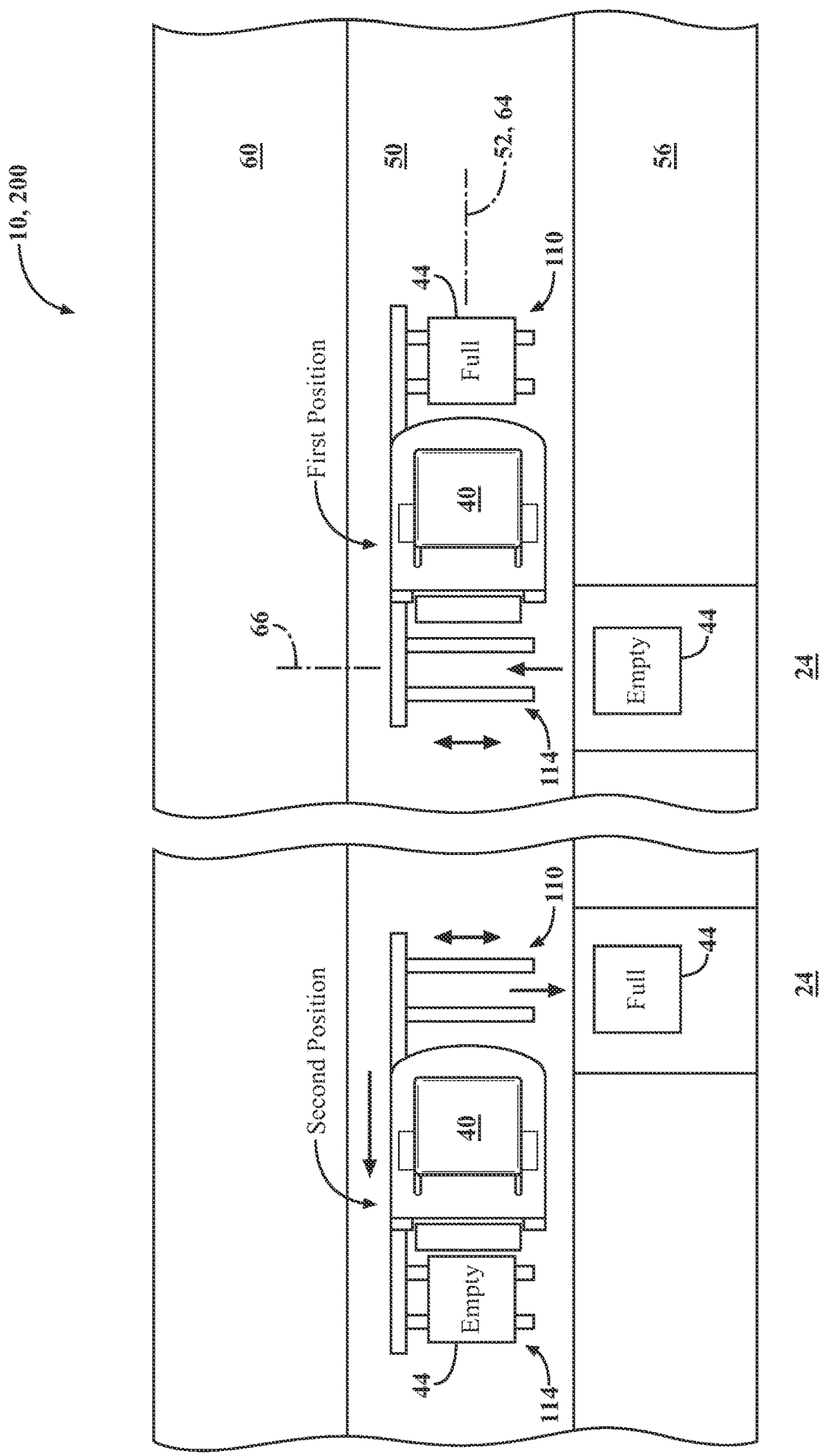
FIG. 7 is a schematic top view of an assembly area showing a transport vehicle in an assembly area in a first position removing an empty container and an indexed second position depositing a full container in its place.

As best seen in FIGS. 7 and 8, and in the example of production start-up, exemplary method step 210A includes the transport vehicle 40 engaging a predetermined full container 44 including the correct components to replace the empty container 44 in the assembly area. In this example, transport vehicle 40 is positioned to engage a full container 44 from a predetermined bay 148 from large part rack 144. In the example shown in FIG. 7, transport vehicle first support 110 is positioned directly adjacent to, and aligned with in the x-direction 64 and the z-direction 90, a full container 44 previously positioned in rack aisle 56 and presentation row 150 within reach or extension of first support 110 along y-direction 66.

Figure 8A:
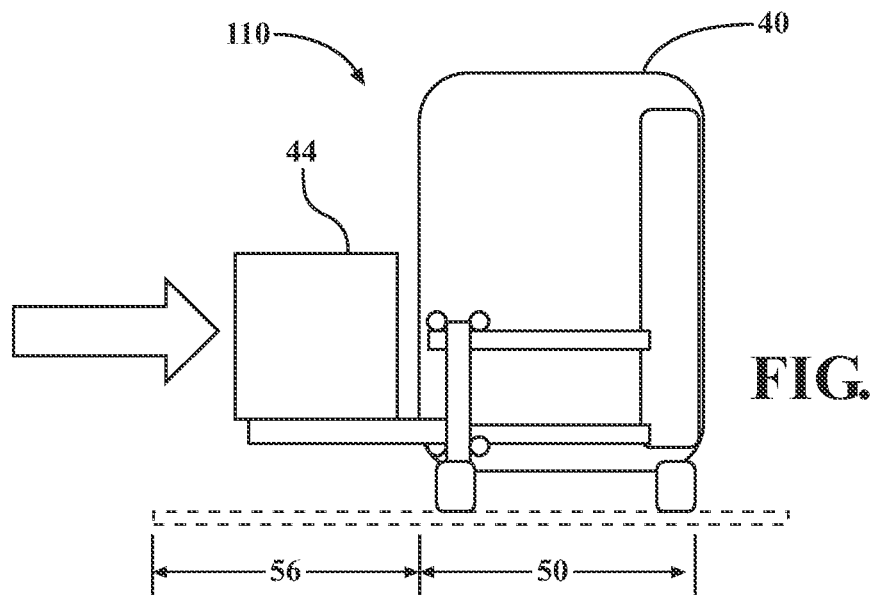
FIGS. 8A-8C are schematic side views of alternate positions of a component container transport vehicle engaging, securing and depositing a component container.

In one example best seen in FIGS. 8A and 4B, a portion of transport vehicle first support 110 is extended outwardly in the y-direction 66 toward the large rack 144 and full container 44 to engage full container 44. In the example described above, horizontal or second drive 120 may be used to extend or retract the first (or second 114) support 110 in the y-direction 66. As described above, vertical or first drive 94 may then be used to engage and vertically lift or raise the full container off of the rack 144 shelf 146 in the z-direction 90 thereby engaging and supporting the full container 44 as seen in FIG. 8A. Activation of the second 120 and first 94 drive units is controlled by the onboard control system 74 in one of the manners described above (preprogrammed instructions or streamed data signals). One or more sensors 86, 306 on the transport vehicle 40 and/or large rack 144 may be used to positively identify engagement of the first support 110 with the full container 44. Exemplary step 210 is also applicable to use of the transport vehicle 40 second support 114 in the same manner.

Figure 8B:
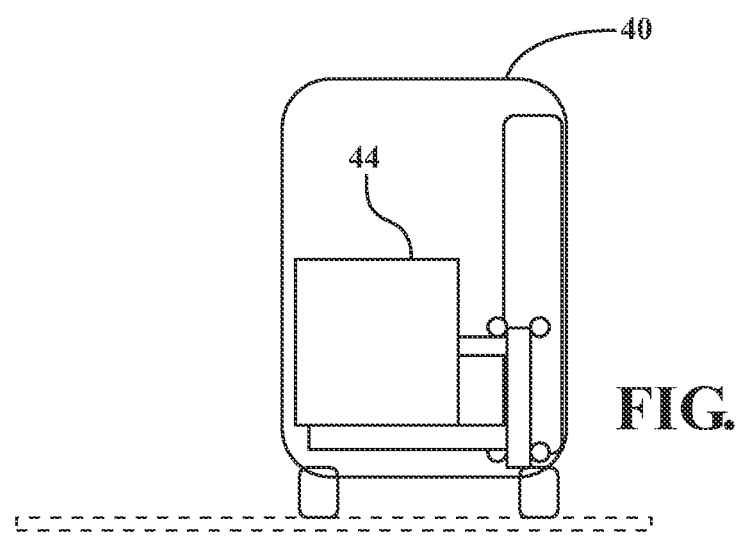
Figure 8C:
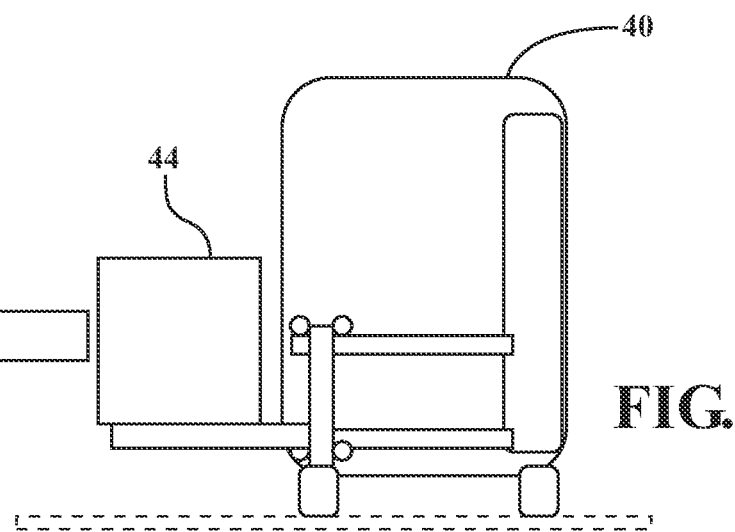

As best seen in FIG. 8B, once the full container 44 has been engaged in the rack aisle 56 by the first support 110, the second drive 120 is activated retract the first support 110 along the y-direction 66 to position the engaged full container 44 in a secure position onboard the transport vehicle 44 for further transport. Where the engaged full container is in an elevated position or row in large rack 144, the first drive 94 would be lowered in the z-direction 90 to the secured position as shown in FIG. 8B. One or more sensors 86, 308 may be used to identify or confirm the full container 44 is located in the secured position. In an alternate example (not shown), where two full containers 44 are needed to support production at this stage of production, for example shift start up, the above described positioning of transport vehicle 74 and engagement with a second full container 44 may be conducted with second support 114 in the same manner. In a normal production operation described, a single full container 44 will be engaged in storage area 20 as described. As further described below, an empty container 44 onboard the transport vehicle may be deposited into the rack aisle 56 in the large rack 144 prior to the transport vehicle moving toward the assembly area 24.

As described above, it is understood that steps 205 and 210A can be used where full container 44 is stored in a different manner in storage area 20, for example differently configured racks, or containers 44. It is further understood that different engagement devices and mechanisms may be used by transport vehicle 40 and first 110 and second 114 supports to physically engage the full container 44 other than forks 130 to suit the particular application and container 44. For example, auxiliary powered devices on first support 110 may actuate to physically grasp container 44, for example opposing compressive grippers (not shown).

Referring to FIGS. 1 and 2, and the example production condition described, in exemplary step 215, the transport vehicle and onboard full container 44 is moved or propelled toward the assembly area 24 along path of travel 52 along material aisle 50. In exemplary step 220, transport vehicle 40 is autonomous propelled and navigated from the storage area 20 to a predetermined position in assembly area 24 where the empty container 44 in need of replacement is positioned. The positioning and alignment of the transport vehicle 44 in the x-direction 64 and the z-direction 90 is achieved in the manner described above for the storage area 20.

As best seen in FIG. 7, in exemplary step 225A with the transport vehicle in the first position, the empty second support 114 is positioned in alignment with the empty container 44 as generally shown. As similarly described above for step 210A, a portion of the second support 114 is extended in the y-direction 66 toward rack aisle 56 to engage the empty container 44 and is then retracted to a secure position in the manner described above for the storage area 20 (FIGS. 8A and 8B). With both the empty container 44 and the full container 44 supported and onboard, the transport vehicle 40 is then quickly indexed or moved along the path of travel 52 slightly downstream to a second position to align the first support 110 and full container 44 in the predetermined position to deposit the full container 44 in the assembly area rack aisle 56 (FIG. 8C) to replace the just-removed empty container 44. In exemplary step 225B, the transport vehicle 40 extends the first support 110 in the y-direction 66 to deposit the full container 44 in the assembly area 24 rack aisle 56 to replace the empty container 44 in a manner similar to that described above, with the exception the first drive 94 is lowered in the z-direction 90 to deposit the full container 44 in the assembly area rack aisle 56 so as to disengage the first support 110 from the full container 44.

In an alternate step 225 (not shown), the full container 44 can be deposited in a different position in the assembly area rack aisle 56 than where the described empty container 44 was positioned. For example, the transport vehicle 40 can first deposit the full container 44 in an alternately predetermined available space in assembly area rack aisle 56 and then at a later time, index or move to align the second support 114 with the empty container 44 and engage and secure the empty container 44 in the manner described. In an alternate step 225 (not shown), the transport vehicle, without an onboard full container 44, can be used to engage separate empty containers 44 with both the first 110 and second 114 supports and transport them to the storage area 20 or other predetermined area and position for further processing. Other alternate uses and method steps 225 to suit the particular application and production requirements known by those skilled in the art may be used.

Once the full container 40 is deposited in the assembly area 20 rack aisle 56 and first support 110 and engaged empty container 44 is returned to the secured position (FIG. 8B), in exemplary step 230, the transport vehicle 40 and onboard empty container 44 is autonomously propelled and navigated back to the storage area 20 to a predetermined position in the manner described above. With the empty container 44 onboard, the transport vehicle is still conducting work (transporting the empty container 44), so there are no "empty" runs with the transport vehicle 40 thereby increasing efficiency of use of the transport vehicle 40 and lowering the time taken to supply full containers 44, and remove empty containers 44, to support the production assembly process.

Figure 15:
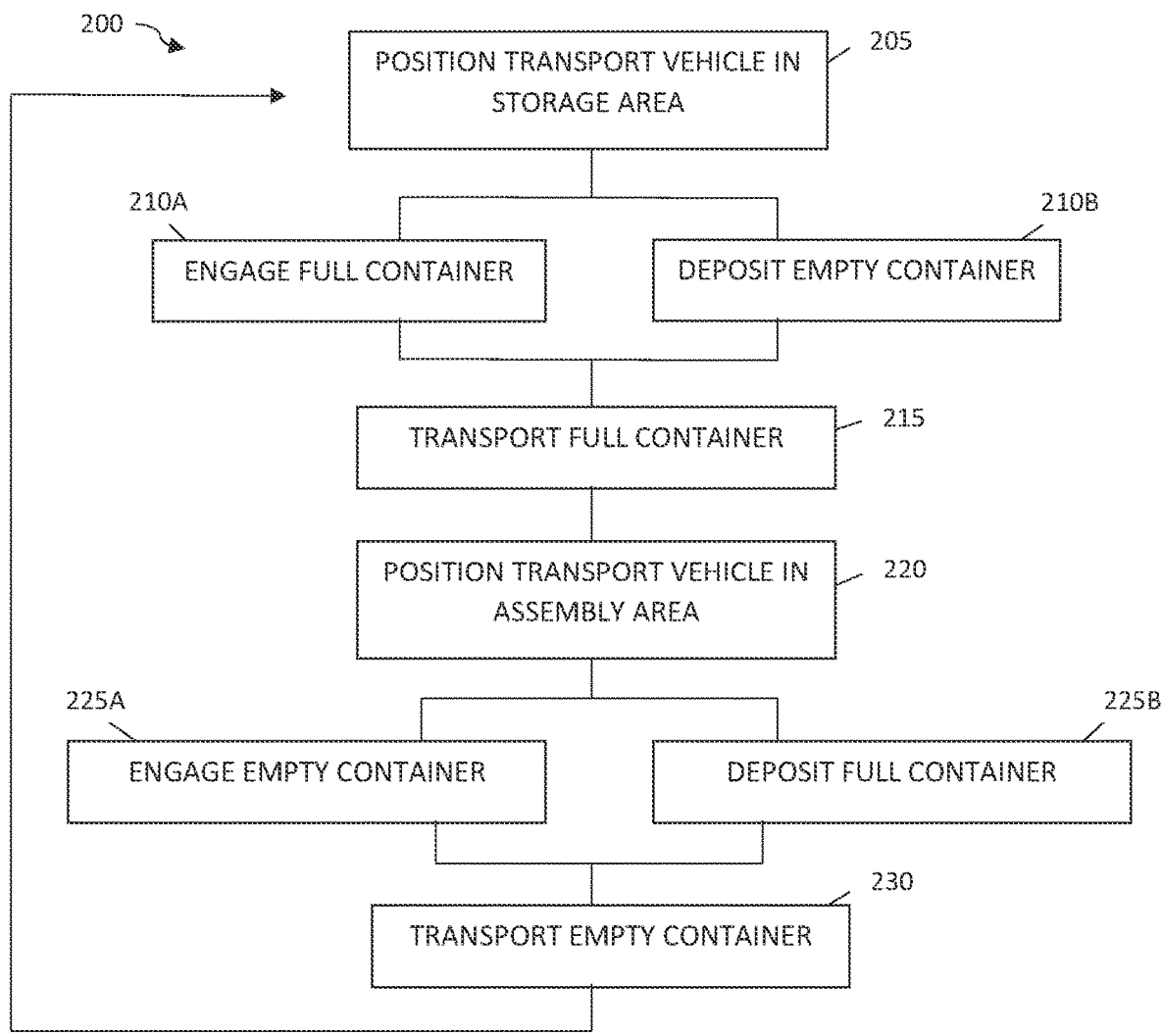
FIG. 15 is a schematic flow chart of one example of a method of the present invention.

As best seen in FIG. 15, once the transport vehicle 40 with the onboard empty container 44 is positioned back in the storage area 20 (step 205), in exemplary step 210B, the transport vehicle 40 is positioned in a predetermined position aligned with the large rack 144 storage bay 148 designated for empty containers 44. The transport vehicle 40 deposits the empty container 44 in the predetermined and designated storage area 20 rack aisle 56 for empty containers 44 in the manner of depositing full containers described in the assembly area 24 (FIG. 7 second positon, 8C). In a similar manner as described above for the FIG. 7 assembly area, the transport vehicle 40 is then quickly moved or indexed along path of travel 52 in the material aisle 50 to a predetermined position aligned with a large rack 144 bay 148 to engage a full container 44. In previously described step 210A, transport vehicle 40 engages a full container 44 for transport to the assembly area in the above manner described (FIG. 8A). The process repeats as the transport vehicle engages and deposits full or empty containers in the storage 20 and assembly areas 24, and reciprocally moves between the storage 20 and assembly 24 areas carrying a full or empty container 44 to support the production process as determined by the local 92 and/or central 92A control systems. In an alternate example of steps 210A and B as described, it is further understood that prior to depositing the empty container 44 in rack 144, the transport vehicle 40 may first engage the full container 44 from rack 144 and then at a later time, deposit the empty container 44 in rack 144 prior to traveling back to the assembly area 24 to replace an empty container 44 with the engaged full container 44.

In an example alternate method 200 where the transport vehicle 40B includes a single first support 110 (FIGS.

11A-C), two transport vehicles 40 (40D-F) may be used in a coordinated and/or synchronous manner to achieve the same methods and efficiencies of engaging a container and depositing a container 44 described above in the storage 20 and assembly areas 24 using a single transport vehicle with first 110 and second 114 supports. In one example, a pair of transport vehicles 40D are preprogrammed with instructions, or streamed wireless data signals in the manner described above, to effectively move together along material aisle 50 and operate in a coordinated and/or synchronous manner to engage and deposit containers 44 in the storage 20 and assembly 24 areas in the manners described. Other uses of multiple transport vehicles 40D-F to achieve the advantages and efficiencies described known by those skilled in the art may be used.

Figure 12:
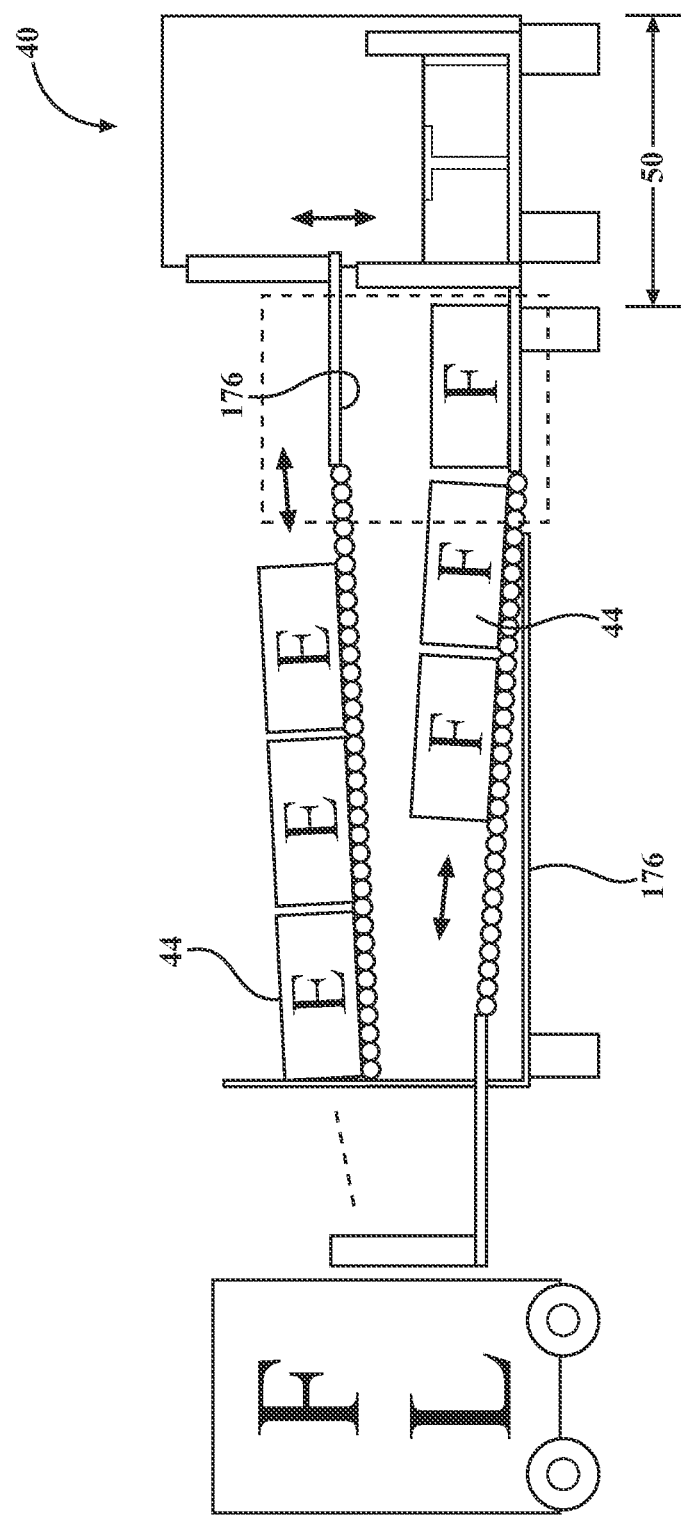
FIG. 12 is a schematic front view of an alternate example of use of a component container transport vehicle.

Referring to FIG. 12, an alternate application of transport vehicle 40 and method is shown in combination with continuous conveyors 176 which load/unload respective full containers 44 ("F") and empty containers 44 ("E") to and from the transport vehicle 40 to a separate transfer device ("FL") for further transport or processing. It is understood that devices other than continuous conveyors 176 in combination with transport vehicles 40, may be used to suit the particular application and production requirements as known by those skilled in the art.

It is understood for method 200 that additional method steps, or removal of method steps, and/or execution of the described steps in a different order, at different times, or simultaneous in time, may be used to suit the particular application and production performance requirements as by those skilled in the art.

Exemplary method 200, and particularly, but not exclusively, steps 210A,B and 225A,B, provide significant advantages over prior systems and methods. Conventional transport vehicles 40 with single supports, for example a common fork lift, have significant disadvantages where an empty container requires replacement by a full container. Use of a conventional fork lift and similar material transport devices require multiple and separate actions (put down the transported full container; pick up, move and then put down the removed empty container; then pick up/reacquire, move and deposit the full container in its place, then pick up/reacquire the removed empty container for transport). This use of a single conventional forklift further requires additional transport runs by a single fork lift (remove the empty container, deposit the empty container in a storage area, and then acquire and move the full container). Alternately, multiple conventional fork lifts are needed to do the separate actions in order to reduce the disadvantages and inefficiencies described. This conventional system, devices and methods are time consuming and inefficient. The present invention example as described with first 110 and second 114 supports, and simple indexing in the assembly 24 or storage 20 areas, provides quick empty container replacement and a much faster and efficient solution. The advantages are further achieved on the container storage area side where the empty containers are deposited and full containers engaged.

Figure 14:
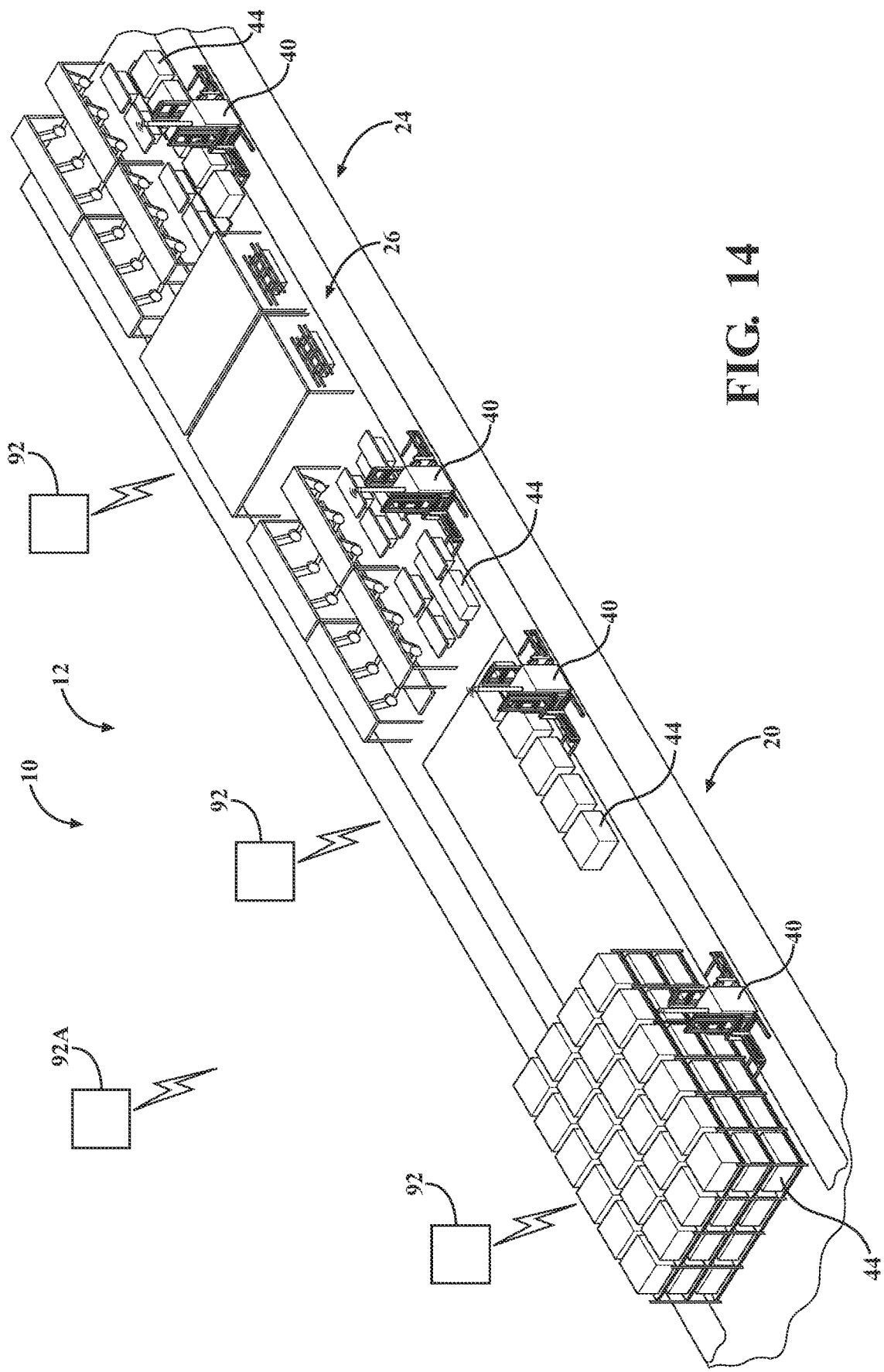
FIG. 14 is a schematic diagram of an example of an assembly logistics monitoring system shown with the example in FIG. 1.

Referring to FIGS. 13 and 14 an example of a control system 300 to serve as a transport vehicle control system 74, and a local 92 and/or central control system 92A is illustrated (collectively referred to as control system 300). Referring to FIG. 13, exemplary control system 300 includes a computing device, or multiple computing devices, working cooperatively. The exemplary control system 300 computing device includes common hardware components, including but not limited to, a central processing unit (CPU) 302, data memory storage device 304, one or more controllers (including but not limited to programmable logic controllers (PLC)) 310, input/output devices 312, transmitter and receiver 314 for sending and receiving wireless data signals, actuators 308 (for example electric motors), and sensors 86, 306. These hardware components are in data signal communication with one another, either through hard wire connections or wireless communication protocols, through a bus 320 or other suitable hardware. Other hardware components, including additional input and output devices 312, to suit the particular application and performance specifications known by those skilled in the art may be used. Examples of input devices include, but not limited to, touch sensitive display devices, keyboards imaging devices and other devices that generate computer interpretable signals in response to user interaction. Examples of output devices include, but not limited to, display screens, speakers, alert lights and other audio or visually perceptible devices. Control system 300 is powered by the power source 312, for example a rechargeable battery or electrical power provided to the facility 12.

Exemplary processor 302 can be any type of device that is able to process, calculate or manipulate information, including but not limited to digital information, that is currently known or may be developed in the future. One example of a processor is a conventional central processing unit (CPU).

The exemplary data memory storage device 304 may include devices which store information, including but not limited to digital information, for immediate or future use by the processor 302. Examples of memory storage devices include either or both of random access memory (RAM) or read only memory (ROM) devices. The memory storage device 304 may store information, such as program instructions that can be executed by the processor 302 and data that is stored by and recalled or retrieved by the processor 302. Additionally, portions of the operating system for the computational device and other applications can be stored in the data memory storage device 304. Non-limiting examples of memory storage device 304 include a hard disk drive or a solid state drive. Alternately, portions of the stored information may be stored in the cloud (remote storage devices or data centers) and selectively retrieved through wireless protocols.

In one example of system control system 300 includes a suitable software operating system and preprogrammed software to execute predetermined actions, functions or operations of the system 10 described herein. The operating system and software may be stored in the data memory storage device 304 and processed and executed by the processor 302 through controller 310 and actuators 308.

Referring to FIGS. 13 and 14, in one example, system 10, or components thereof for example transport vehicles 40, may receive operational instructions and commands through data signals wirelessly streamed in real time from the local 92 or central control system 92A, or other local or central control systems. Examples of communication networks that may be in use in facility 12 may include, but are not limited to, large area networks (LAN) or a campus area network (CAN). Examples of wireless communication networks, systems and protocols usable with system 10 include wireless routers for communication based on IEEE standard 802.11 (also known as wi-fi). Other wireless communication protocols, for example BLUETOOTH, may be used. Other wired communication systems and components for communication may be based on IEEE standard 802.3 (also known as the Ethernet) may be used in certain applications. Other forms of communication networks, wired and wireless communication protocols, systems and devices known by those skilled in the art may be used.

The above-described autonomous or self-driving mode of operation of transport vehicles 40 may be achieved through use of one or a plurality of sensors 86, 306 onboard device 40 for example, omni-directional LIDAR (light imaging, detection and ranging), onboard processing of the received sensor data by the transport vehicle 40, and onboard execution of commands through the onboard control system 74 and actuators 308 to navigate and move the vehicle 40 along a path of travel 52. Other types and forms of sensors 86, 306, and positional monitoring and navigation systems may be used including, but not limited to, global positioning satellite (GPS) systems, triangular positioning devices, ultrasonic sensors, laser sensor systems, radar, proximity sensors, and/or visual imaging devices or systems known by those skilled in the art. As noted, instructions and commands for movement and navigation guidance of each vehicle 40 may alternately, or in combination, be received by the respective vehicle 40 from a local and/or central control system 92A for execution by the respective vehicle 40 or through preprogrammed instructions stored in the memory data storage device 304 in the transport vehicle control system 74. Other control system 300 hardware, software, and communication devices and protocols, may be used to suit the system and methods 10, and particular application, as known by those skilled in the art While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for assembly material logistics and handling comprising:
    selectively positioning a component transport vehicle positioned along a material aisle in at least one of a component storage area or a component assembly area, the storage area positioned outside of and distant from the assembly area, the material aisle positioned adjacent to a component rack aisle and extending in an x-coordinate direction;
    the transport vehicle:
        at a first time, engaging for transport in the storage area a selected one of a plurality of full component containers positioned in the component rack aisle and depositing in the component rack aisle in the storage area an engaged empty component container transported from the assembly area; and
        at a second time, engaging for transport in the assembly area a selected one of a plurality of empty component containers positioned in the component rack aisle in the assembly area and depositing in the assembly area component rack aisle an engaged full component container transported from the storage area; and
    selectively and reciprocally moving the transport vehicle including at least one of the engaged full component container or the engaged empty component container along the material aisle between the storage area and the assembly area.

2. The method of claim 1 wherein the step of engaging for transport the selected one of the plurality of full component containers or the empty component containers further comprises:
    extending a portion of the transport vehicle in a y-coordinate direction into the rack aisle to engage the respective selected full or empty component container, the y-coordinate direction transverse to the x-coordinate direction; and
    retracting the portion of the transport vehicle and the respective engaged full or empty component container in the y-coordinate direction from the rack aisle to the material aisle to a secure position on the transport vehicle prior to moving the transport vehicle between the storage area and the assembly area.

3. A method for assembly material logistics and handling comprising:
    selectively positioning a component transport vehicle positioned along a material aisle in at least one of a component storage area or a component assembly area, the material aisle positioned adjacent to a component rack aisle and extending in an x-coordinate direction, the transport vehicle including a first component container support and a second component container support, the second container support independently operable relative to the first container support;
    wherein the transport vehicle:
        at a first time, engaging for transport in the storage area by the first container support a selected one of a plurality of full component containers positioned in the component rack aisle and depositing by the second container support in the component rack aisle in the storage area an engaged empty component container transported from the assembly area; and
        at a second time, engaging with the second container support for transport in the assembly area a selected one of a plurality of empty component containers positioned in a predetermined position in the component rack aisle in the assembly area and depositing with the first container support the transported full component container in the predetermined position in the assembly area rack aisle; and
    selectively and reciprocally moving the transport vehicle including at least one of the engaged full component container or the engaged empty component container along the material aisle between the storage area and the assembly area.

4. The method of claim 1 wherein the step of depositing the selected one of the plurality of full component containers or the empty component containers further comprises:
    extending a portion of the transport vehicle and the engaged selected full component container or the empty component container in a y-coordinate direction from the material aisle into the rack aisle to disengage the respective selected full or empty component container, the y-coordinate direction transverse to the x-coordinate direction; and
    retracting the portion of the transport vehicle in the y-direction from the rack aisle to the material aisle prior to moving the transport vehicle between the storage area and the assembly area.

5. The method of claim 3 wherein following engaging of the empty component container with the second container support and while the transport vehicle continues to engage the empty component container, the method further comprising the step of indexing the transport vehicle along the material aisle to align the first container support carrying the full container with the predetermined position to deposit the full container in the predetermined position in the assembly area rack aisle vacated by the empty component container.

6. The method of claim 3 wherein engaging the empty component container with the second container support in the predetermined position occurs at a first time and depositing the full component container in the predetermined position occurs at a second time, the second time later than the first time.

7. The method of claim 3 wherein at least one of the transport vehicle engaging the full or empty component container, depositing the full or empty containers, or reciprocally moving along the material aisle, is conducted autonomously.

8. A method for assembly material logistics and handling comprising:
   selectively positioning a component transport vehicle positioned along a material aisle in at least one of a component storage area or a component assembly area, the material aisle positioned adjacent to a component rack aisle and extending in an x-coordinate direction, the transport vehicle including a first component container support and a second component container support, the second container support independently operable relative to the first container support;
   the transport vehicle:
      at a first time, depositing with the second container support an empty component container transported from the assembly area in a first predetermined position in the storage area rack aisle and engaging for transport in the storage area with the first container support a selected one of a plurality of full component containers positioned in a second predetermined position in the storage area rack aisle; and
      at a second time, engaging with the second container support for transport in the assembly area a selected one of a plurality of empty component containers positioned in the component rack aisle in the assembly area and depositing with the first container support in the assembly area an engaged full component container transported from the storage area;
   selectively and reciprocally moving the transport vehicle including at least one of the engaged full component container or the engaged empty component container along the material aisle between the storage area and the assembly area.

9. The method of claim 8 wherein following deposit of the empty component container with the second container support, the method further comprising the step of indexing the transport vehicle along the material aisle to align the first container support with the second predetermined position to engage the full container with the first container support.

10. The method of claim 1 wherein the transport vehicle comprises a first transport vehicle and a second transport vehicle, the second transport vehicle independently operable from the first transport vehicle, the method further comprising one of:
   at the first time, engaging for transport the selected one of the plurality of full component containers in the storage area rack aisle by the first transport vehicle and depositing the engaged empty component container transported from the assembly area in the storage area rack aisle by the second transport vehicle; and
   at the second time, engaging for transport the selected one of the plurality of empty containers in the assembly area rack aisle by the second transport vehicle and depositing the engaged full component container transported from the storage area in the assembly area rack aisle vacated by the empty component container by the first transport vehicle.

11. The method of claim 10 wherein the first transport vehicle and the second transport vehicle move synchronously and coordinatingly together along the material aisle between the storage area and assembly area.

12. The method of claim 1, wherein following engagement and removal of the selected one of the plurality of empty component containers in a predetermined position in the assembly area rack aisle, depositing the transported full container from the storage area in the predetermined position in the assembly area rack aisle vacated by the empty component container.

13. The method of claim 12 wherein at least one of the transport vehicle engaging the full or empty component container, depositing the full or empty containers, or reciprocally moving along the material aisle, is conducted autonomously.

14. A method for assembly material logistics and handling comprising:
   storing a plurality of full component containers positioned along a rack aisle in a storage area extending in an x-coordinate direction, the first storage area positioned upstream of an assembly area;
   storing a plurality of empty component containers positioned along the rack aisle in the assembly area extending in the x-coordinate direction;
   selectively positioning a component transport vehicle positioned along a material aisle in one of the storage area or the assembly area, the transport vehicle having a first component support and a second component support, the material aisle positioned adjacent to the rack aisle and extending in the x-coordinate direction;
   the transport vehicle:
      at a first time, engaging for transport by the first component container support a selected one of the plurality of full component containers positioned in the storage area rack aisle and depositing by the second component container support an engaged empty component container transported from the assembly area in the storage area rack aisle; and
      at a second time, engaging for transport by the second component container support a selected one of the plurality of empty component containers positioned in the assembly area rack aisle and depositing by the first component container support an engaged full component container transported from the storage area in the assembly area rack aisle; and
   selectively and reciprocally moving the transport vehicle including one of the engaged full component container or the engaged empty component container along the material aisle between the storage area and the assembly area.

15. The method of claim 14 wherein the step of engaging for transport the selected one of the plurality of full component containers or the empty component containers further comprises:
   extending the respective first container support or the second container support in a y-coordinate direction into the rack aisle to engage the respective selected full or empty component container, they-coordinate direction transverse to the x-coordinate direction; and
   retracting the portion of the respective first container support or the second container support and the respective engaged full or empty component container in the y-coordinate direction from the rack aisle to the material aisle to a secure position on the transport vehicle prior to moving the transport vehicle between the storage area and the assembly area.

16. The method of claim 15 wherein the step of engaging the selected one of the plurality of full component containers or the empty component containers further comprises moving respective of the first container support or the second container support in a z-coordinate direction relative to the transport vehicle, the z-coordinate direction transverse to the y-coordinate direction.

17. The method of claim 14 wherein the step of depositing the selected one of the plurality of full component containers or the empty component containers further comprises:
extending the respective first container support or the second container support and the engaged selected full component container or the empty component container in a y-coordinate direction from the material aisle into the rack aisle to disengage the respective selected full or empty component container, the y-coordinate direction transverse to the x-coordinate direction; and
retracting the respective first container support or the second container support in the y-direction from the rack aisle to the material aisle prior to moving the transport vehicle between the storage area and the assembly area.

18. The method of claim 17 wherein the step of disengaging the selected one of the plurality of full component containers or the empty component containers further comprises moving a portion of the transport vehicle in a z-coordinate direction relative to the transport vehicle, the z-coordinate direction transverse to the y-coordinate direction.

19. The method of claim 14 wherein the step of selectively and reciprocally moving the transport vehicle between the storage area and the assembly area further comprises:
selectively and autonomously moving the transport vehicle along the material aisle between a plurality of predetermined positions in the storage area and a plurality of predetermined positions in the assembly area.

20. The method of claim 19 further wherein the transport vehicle includes a control system for powered propulsion and directional navigation, the method further comprising:
receiving wireless data signals from at least one of a local or a central control system for use by the transport vehicle to autonomously move the transport vehicle in a predetermined direction and directionally navigate along a predetermined path of travel.

* * * * *